United States Patent [19]
Rokugawa

[11] Patent Number: 5,740,210
[45] Date of Patent: Apr. 14, 1998

[54] DATA DISCRIMINATING CIRCUIT AND A PARALLEL DATA RECEIVER USING THE SAME

[75] Inventor: Hiroyuki Rokugawa, Kawasaki, Japan

[73] Assignee: Fujitsu Limited, Kawasaki, Japan

[21] Appl. No.: 583,961

[22] Filed: Jan. 11, 1996

Related U.S. Application Data

[63] Continuation of Ser. No. 125,754, Sep. 24, 1993, abandoned.

[30] Foreign Application Priority Data

Jan. 21, 1993 [JP] Japan ................ 5-026251

[51] Int. Cl.⁶ ........................................... H04L 7/04
[52] U.S. Cl. ................ 375/362; 375/364; 375/371; 327/5; 327/8
[58] Field of Search ............... 375/362, 364, 375/371; 327/2, 5, 7, 8, 12, 141, 155, 163, 233, 236, 47, 49

[56] References Cited

U.S. PATENT DOCUMENTS

| | | | |
|---|---|---|---|
| 4,860,323 | 8/1989 | Malter | 375/111 |
| 4,965,814 | 10/1990 | Yoshida et al. | 375/111 |

*Primary Examiner*—Stephen Chin
*Assistant Examiner*—Don Vo
*Attorney, Agent, or Firm*—Staas & Halsey

[57] ABSTRACT

A data discriminating circuit is provided on the receiver side of a digital signal transmission system, and performs data discrimination with a proper phase relation settled between data and a clock signal. In the discrimination circuit, a data discriminating section discriminates input data in synchronism with a clock signal and outputs resultant data as discriminated data, a phase-relation judging section judges a phase relation between the input data and the discriminated data, a clock phase controller produces a phase control signal to control and initially-determined phase of the clock signal, based on an output of the phase-relation judging section, and a clock phase judging section determines a phase of the clock signal and alters the initially-determined phase of the clock signal in accordance with the phase control signal from the clock phase controller.

46 Claims, 20 Drawing Sheets

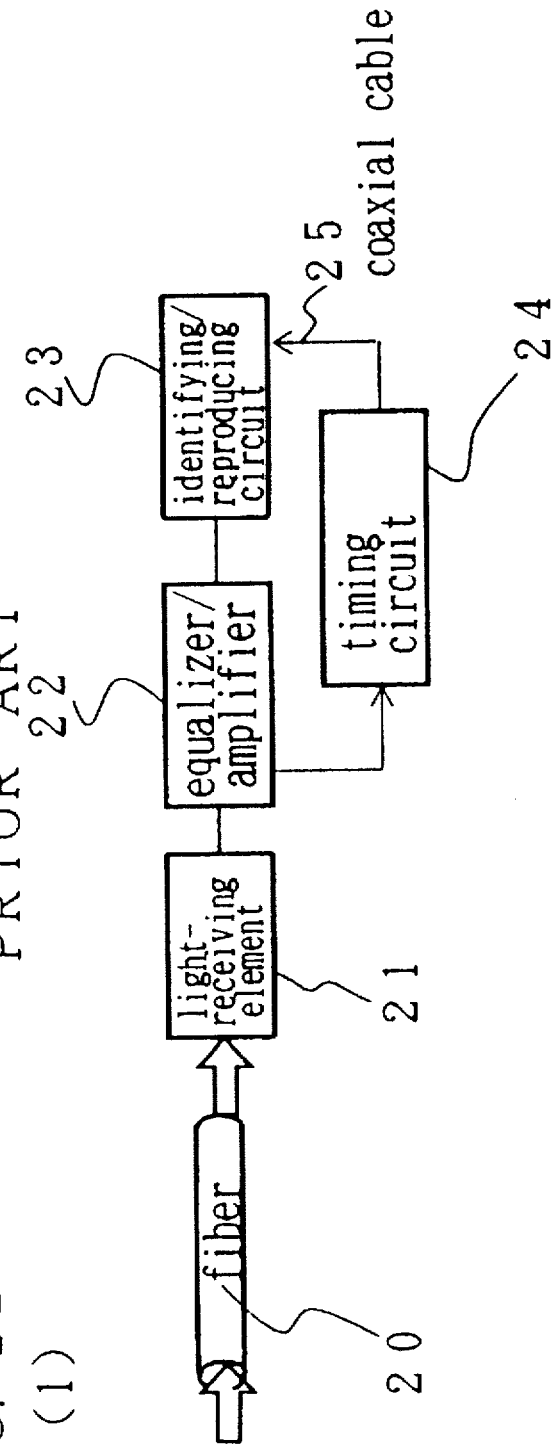
FIG. 22 (1) PRIOR ART

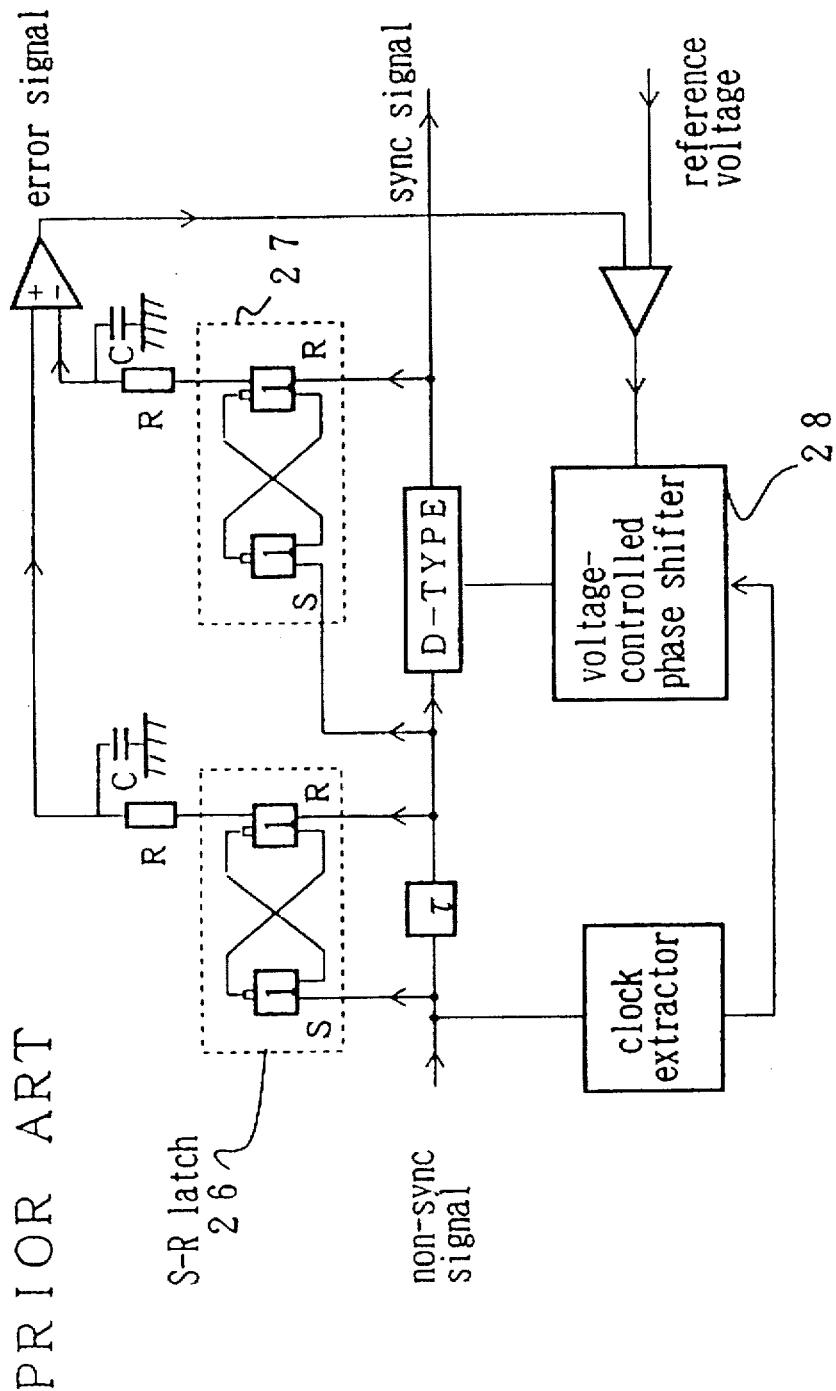
FIG. 22 (2)
PRIOR ART

DATA DISCRIMINATING CIRCUIT AND A PARALLEL DATA RECEIVER USING THE SAME

This application is a continuation, of application Ser. No. 08/125,754, filed Sep. 24, 1993, now abandoned.

BACKGROUND OF THE INVENTION

1. Field of the Invention

The present invention relates to a data discriminating circuit provided on the receiver side of a digital signal transmission system, and a receiver of a parallel data transmission system using the data discriminating circuit.

2. Description of the Related Art

Due to the development of the optical communication technology, attention is paid to a so-called fiber to the home (FTTH) or the like and study has been made on this system. This FTTH system implements optical transmission technology to lay optical fibers in subscriber systems as well as the trunk line system to thereby ensure wide-band information transmission of dynamic images or the like.

An important factor in implementing optical transmission technology in a subscriber system is that the implementation should be accomplished at a low cost. It is therefore necessary to design the structures of the transmitter and receiver considerably simpler than those used in the trunk line system, thus making the adjusting components as few as possible.

In the receiving section, particularly, it is necessary to properly adjust the timing relation (phase relation) between data and a discrimination clock in the data discriminating circuit which converts an optical signal, sent over an optical fiber, into an electric signal and then discriminates digital "1" or "0."

It is also important to simplify this circuit portion by LSI or the like to thereby eliminate the need for separate adjustments as much as possible. Even in designing the circuit into LSI, the structure should be made as simple as possible to meet some requirements for the implementation of the data discriminating circuit in the subscriber system, such as reduction of consumed power and reduction of the circuit scale.

Attention is also paid to the application of optical transmission technology, which uses the wide band characteristic of optical fibers, to high-speed data transmission not only in the trunk line system but also between or in communication equipments, such as transmission terminals or switchboards, or in computers, and study has been made on that application.

An optical parallel transmission system to transmit many signals in parallel is effective in such an optical transmission interface. But, this transmission system should clarify the aforementioned requirements on the receiver side.

Further, parallel transmission is likely to cause a variation (skew) in data transmission time between different pieces of data that are transmitted in parallel. In some cases, this skew limits the transmission distance.

To overcome this shortcoming specific to parallel transmission, the receiver should correct the skew between parallel data received to synchronize the phases of the data bit by bit.

FIG. 22(1) illustrates the structure of a conventional optical receiver serving as an optical repeater that executes data transmission between terminal devices in the trunk line system.

In the conventional optical repeater, an optical signal transmitted over an optical fiber 20 is photoelectrically converted into an electric signal by a light-receiving element 21. This electric signal is amplified to a discriminatable level by an equalizer/amplifier 22, and at the same time is supplied to a timing circuit 24 which extracts a discrimination clock from the received signal. The amplified signal and the clock are both input to a discriminating/reproducing circuit 23.

At this time, the phase relation between the amplified signal and clock which are input to the discriminating/reproducing circuit 23 is not stable due to a variation in transmission time in the individual circuits or other factors.

To keep the proper phase relation, some kind of adjusting means should be provided to adjust the phase relation.

In many optical repeaters of the above type, a coaxial cable 25 or the like is used to connect the timing circuit 24 to the discriminating/reproducing circuit 23 and the length of the coaxial cable 25 is properly adjusted for each receiver to thereby provide the desired phase relation.

Due to the recent development and improvement of IC technology, there appears an optical receiver equipped with a circuit for automatically adjusting the phase relation. FIG. 2(2) exemplifies such an automatic phase adjusting circuit (which has been proposed by Peter Cochrane et al. in IEEE Journal on Selected Areas in Communications, Vol. SAC-4, No. 9, December 1986).

In the circuit shown in FIG. 22(2), a signal before discrimination and a signal after discrimination are respectively input to S-R latches 26 and 27. The signal pulses output from those S-R latches are integrated, and the level of the resultant signal is then compared with a reference level (reference voltage). The result of the comparison is fed back to a voltage-controlled phase shifter 28 to keep the phase of the clock at a predetermined value.

If the optimal phase relation changes due to the temperature characteristic of the circuit or the time-dependent characteristic of the circuit, a constant phase relation can be maintained by the feedback control unlike in the case of using a coaxial cable as shown in FIG. 22(1).

This automatic phase adjusting circuit is designed to perform analog control on the clock phase to keep the proper phase. This circuit is complicated and increases the consumed power in many cases. It is therefore difficult to adapt this circuit to the subscriber system unless the circuit structure is simplified and the consumed power is reduced.

As described above, the transmission length in the subscriber system is very short (about 1 to several Km) as compared with that in transmission between terminal devices. Therefore, the optical level of the input to the optical receiver can be increased systematically. Accordingly, the data discriminating circuit can have a large phase margin to secure the desired characteristic in the received signal. Instead of the aforementioned analog phase control, therefore, a plurality of clocks having different phases may be prepared and a clock of a particular phase may be selected from those clocks to acquire the desired discrimination characteristic.

An example of the structure of such a data discriminating circuit is disclosed in Japanese Unexamined Patent Publication Nos. 233850/1989 and 188050/1989.

In the former Japanese Unexamined Patent Publication No. 233850/1989, the same data is discriminated using two types of clocks having slightly different timings. When the discrimination results differ from each other, it is considered that the clock phase is not the proper one and the clock phase is inverted.

In the latter Japanese Unexamined Patent Publication No. 188050/1989, a clock with a frequency twice the data transmission rate is prepared. When data is input, a T-FF (flip-flop) is reset at its rising edge to frequency-divide the double-frequency clock, and the data is discriminated with a clock having a slight delay from the rising of the data.

In both techniques, the data discriminating circuit itself can be constituted of a logic circuit, for example, a gate array, thus ensuring the simplification of the circuit and reducing the cost.

According to the technique disclosed in Japanese Unexamined Patent Publication No. 233850/1989, even when data of "0" is erroneously discriminated as "1" with both types of clocks, either clock is considered as the proper one.

Further, the discrimination result is influenced by the time difference between the two types of clocks and the time difference occurring at the time the input data is distributed to two discrimination sections (D-FF), very delicate timing design is required. As the technique disclosed in Japanese Unexamined Patent Publication No. 188050/1989 deals with a double-frequency clock, the data discriminating circuit should operate at this frequency, and a clock having a frequency twice the transmission rate of the transmission system should be prepared. Therefore, the general structure of the system lacks affinity, and this system should have a clock multiplication circuit, thus resulting in an eventual enlargement of the circuit scale.

According to the conventional systems shown in FIGS. 22(1) and 22(2), it is difficult to overcome the problem in a parallel transmission system from the viewpoint of simpler structure and low consumed power. The proper clock control is performed on each data in the parallel transmission, so that the phase continuously varies as viewed in the parallel direction.

An optical parallel transmission system using this circuit system and a bit synchronization structure are disclosed in, for example, Japanese Unexamined Patent Publication No. 278836/1987. While the disclosed structure can achieve bit-by-bit phase synchronization in principle, the actual circuit scale is too large to be implemented in the aforementioned parallel transmission system.

The transmission length between devices and in the transmission system in each device machine is very short (about several hundred meters to several Km) as compared with that in transmission between terminal devices. Therefore, the optical level of the input to the optical receiver can be increased systematically. Accordingly, the data discriminating circuit can have a large phase margin to secure the desired characteristic in the received signal. Instead of the aforementioned analog phase control, therefore, a plurality of clocks having different phases may be prepared and a clock of a particular phase may be selected from those clocks to acquire the desired discrimination characteristic.

Since the discrimination process is performed by selecting the proper one of several clocks having discrete phases, bit-by-bit phase synchronization or bit synchronization becomes possible by re-executing the discrimination process using the common phase margin portion.

The structures of such parallel data discrimination and bit synchronizing device are disclosed in, for example, Japanese Unexamined Patent Publication No. 233849/1989. According to the invention described in this Japanese publication, the discrimination process is carried out as follows. A clock having a frequency twice the transmission rate is prepared and frequency-divided by a T-FF, yielding two clocks with slightly different timings. The same data is discriminated using those two clocks. When the discrimination results differ from each other, it is considered that the clock phase is not the proper one and the clock phase is inverted.

More specifically, the aforementioned double-frequency clock is used to prepare a clock with a different phase from that of the discrimination clock ¼ time slot, and the discrimination process is repeated using this new clock.

According to this technique, the data discriminating circuit itself can be constituted of a logic circuit, for example, a gate array, thus ensuring the simplification of the circuit and reducing the cost.

Since this data discriminating circuit deals with a double-frequency clock, it should operate at this frequency, and the clock that has a frequency twice the transmission rate of the transmission system should be prepared. Therefore, the general structure of the system lacks affinity, and this system should have a clock multiplication circuit, thus eventually enlarging the circuit scale.

According to the prior arts, it is difficult to achieve the system which reliably and surely performs data discrimination and bit synchronization while properly keeping the phase relation between data and the clock. Such a system, if accomplished, should suffer the complicated circuit and the large circuit scale.

SUMMARY OF THE INVENTION

It is therefore a general object of the present invention to provide a data discriminating circuit capable of performing data discrimination with the proper phase relation settled between data and a clock with a relatively simple circuit structure.

It is more specific object of this invention to design a receiver for a parallel data transmission system, using that data discriminating circuit.

It is an another object of this invention to design a transmitter/receiver which employs an optical transmission technology to have a considerably simpler structure, and thus as few adjusting portions as possible, than the one used in a trunk line system.

It is a still another object of this invention to provide a data discriminating circuit capable of properly adjusting the timing relation between data and a discrimination clock.

It is a further object of the present invention is to provide a data discriminating circuit comprising a data discriminating section for discriminating input data in synchronism with a clock signal and outputting resultant data as discriminated data; a phase-relation judging section for receiving the input data and the discriminated data and judging a phase relation therebetween; a clock phase controller for producing a phase control signal to control an initially-determined phase of the clock signal based on an output of the phase-relation judging section; and a clock phase judging section for determining a phase of the clock signal and altering the initially-determined phase of the clock signal in accordance with the phase control signal from the clock phase controller.

It is a still further object of this invention is to provide a parallel data receiver comprising a plurality of data discriminating circuits provided in association with a plurality of input signals transmitted in parallel; a common clock signal generator; and a bit synchronizer for receiving discriminated data from the plurality of data discriminating circuits and providing bit synchronization between the discriminated data, with a clock signal from the clock signal generator taken as a reference, each of the plurality of data discriminating circuits including a data discriminating section for discriminating input data in synchronism with a clock signal and outputting resultant data as discriminated data, a phase-relation judging section for receiving the input data and the discriminated data and judging a phase relation therebetween, a clock phase controller for producing a phase control signal to control an initially-determined phase of the clock signal, based on an output of the phase-relation judging section, and a clock phase judging section for determining a phase of the clock signal and altering the initially-determined phase of the clock signal in accordance with the phase control signal from the clock phase controller.

Other objects and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 22(1) and FIG. 22(2) are block diagrams exemplifying prior arts.

DETAILED DESCRIPTION OF THE PREFERRED EMBODIMENTS

Figure 1:
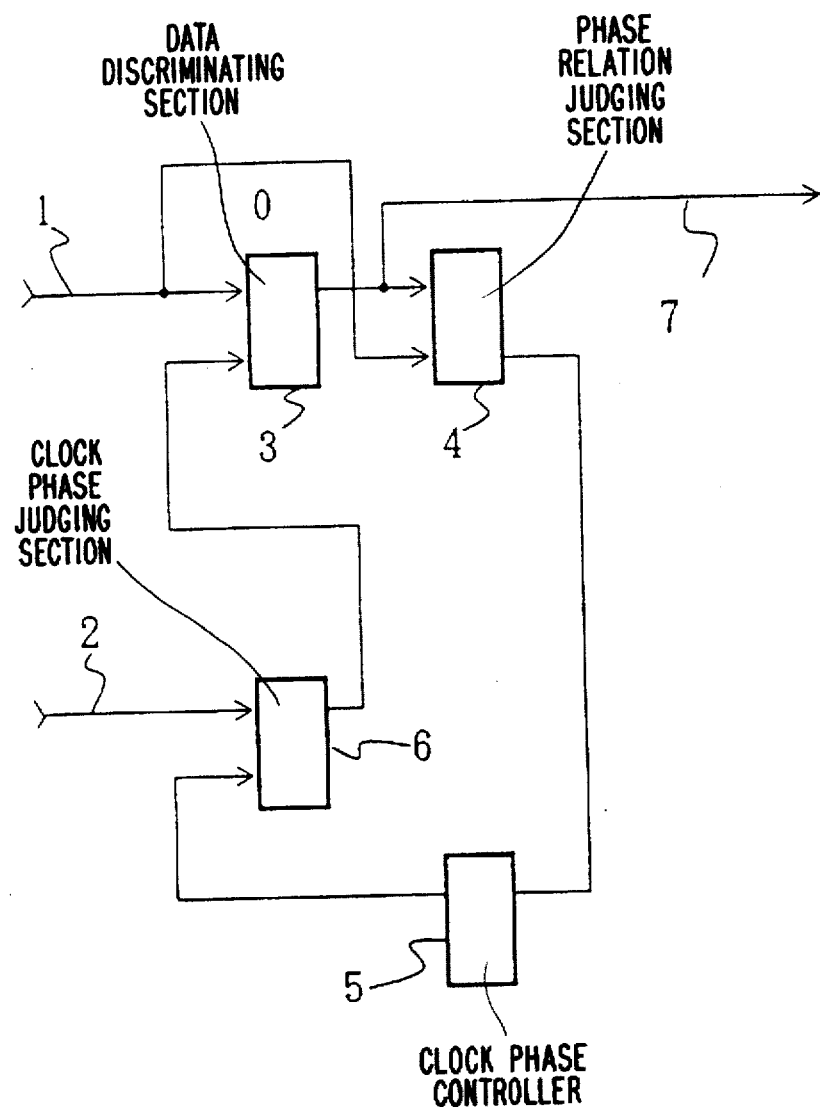
FIG. 1 is a diagram illustrating the principle of synchronizing data with a clock according to the present invention.

FIG. 1 presents a block diagram illustrating the principle of a data discriminating circuit according to the present invention, which can ensure data discrimination with the phase relation between input data and a clock signal set to the proper state.

In FIG. 1, there is a data discriminating section 3 which discriminates input data 1 in synchronism with a clock signal and outputs it as discriminated data 7.

The data discriminating circuit further includes a phase-relation judging section 4 which receives the input data 1 and the discriminated data 7 and judges the phase relation therebetween. Reference numeral "5" denotes a clock phase controller which produces a phase control signal to control the initially-determined phase of the clock signal based on the output of the phase-relation judging section 4.

The data discriminating circuit further includes a clock phase judging section 6 which determines and changes the initially-determined phase of the clock signal 2 in response to the phase control signal from the clock phase controller 5.

Figure 2:
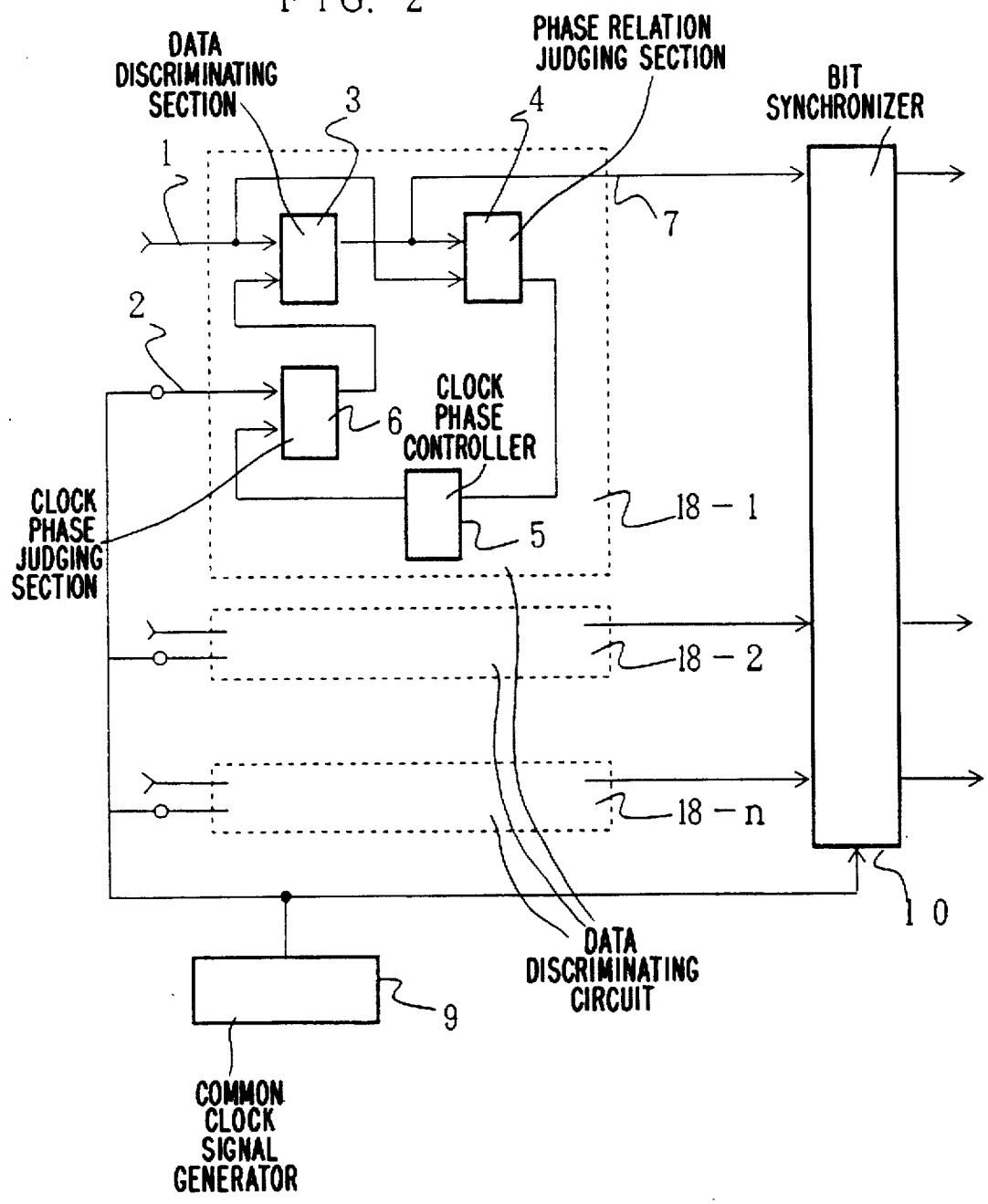
FIG. 2 is a diagram illustrating the principle of bit synchronization in parallel transmission in this invention.

FIG. 2 is a block diagram illustrating the principle structure of a receiver according to this invention, which can accomplish bit synchronization of parallel data on the receiver side in a parallel transmission system.

In FIG. 2, the receiver includes a plurality of data discriminating circuits 18-1 to 18-n respectively provided for a plurality of input signals 1 that are transmitted in parallel, a common clock signal generator 9, and a bit synchronizer 10, which receives discriminated data from each of the data discriminating circuits 18-1 to 18-n and performs bit synchronization of the discriminated data with a clock signal 2 from the clock signal generator 9 as a reference.

Each of the data discriminating circuits 18-1 to 18-n is constituted as follows.

Each data discriminating circuit comprises a data discriminating section 3, a phase-relation judging section 4, a clock phase controller 5 and a clock phase judging section 6. The data discriminating section 3 discriminates input data 1 in synchronism with the clock signal 2 and outputs it as discriminated data 7.

The phase-relation judging section 4 receives the input data 1 and the discriminated data 7 and judges the phase relation therebetween.

The clock phase controller 5 produces a phase control signal to control the initially-determined phase of the clock signal based on the output of the phase-relation judging section 4.

The clock phase judging section 6 determines and changes the initially-determined phase of the clock signal in response to the phase control signal from the clock phase controller 5. In the principle diagram of FIG. 1, first, the input data 1 is input to the data discriminating section 3, and the clock signal 2 with the phase initially set by the clock phase judging section is also input to the data discriminating section 3.

As a result, the input data 1 has its "0" and "1" discriminated by the data discriminating section 3 and is then output.

The discriminated data output from the data discriminating section 3 is distributed into two directions: one is output as the discriminated data 7 and the other one is input to the phase-relation judging section 4 which in turns judges the phase relation between the data and the clock signal.

The phase-relation judging section 4 determines the phase relation between the discriminated data 7 and the input data 1. More specifically, the phase-relation judging section 4 discriminates the discriminated data 7 again at, for example, the falling edge of the input data 1.

If the data "1" has been correctly discriminated with the initial-state clock signal, the result of the discrimination of the discriminated data at the falling edge of the input data 1 also becomes "1." If the data "1" has been erroneously discriminated as "0" with the initial clock signal, the result of the discrimination of the discriminated data at the falling edge of the input data 1 becomes "0."

In this manner, it is possible to find out if the input data 1 has been correctly discriminated with the initial clock signal. The result of this judgment is sent to the clock phase controller 5 from the phase-relation judging section 4. As a result, the control signal to indicate how the phase of the clock signal should be controlled next is sent to the clock phase judging section 6, which in turn determines the clock signal that should be finally used in data discrimination.

The clock signal determined by the clock phase judging section 6 is input to the data discriminating section 3 so that data discriminated with the clock signal with the proper phase can be obtained.

The data discriminating circuits 18-1 to 18-n in FIG. 2 each have the same structure as the one for clock synchronization illustrated in FIG. 1. The function of each of the data discriminating circuits 18-1 to 18-n is therefore the same as the one already explained above with reference to FIG. 2.

In FIG. 2 a clock signal generator 9 is provided to generate a clock that is to be supplied to the bit synchronizer 10. The bit synchronizer 10 therefore discriminates parallel data from the data discriminating circuits 18-1 to 18-n all using the received clock that has a common phase. In other words, all pieces of the parallel data are synchronized with the clock used in the discrimination, thus ensuring bit-by-bit synchronization.

First Embodiment

Figure 3:
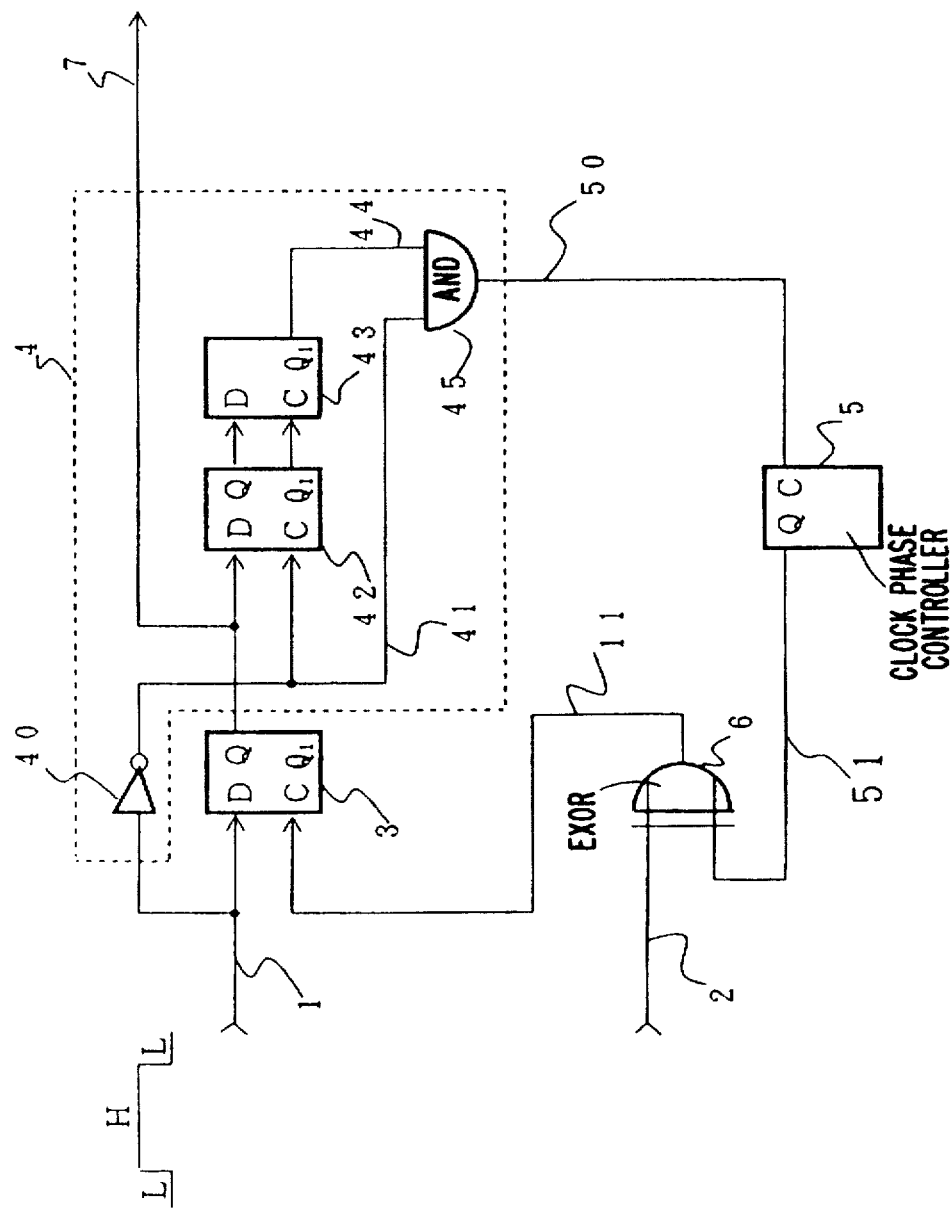
FIG. 3 is a block diagram showing a first embodiment of this invention associated with the principle diagram for clock synchronization in FIG. 1.

FIG. 3 is a block diagram showing a first embodiment of this invention associated with the principle diagram of FIG. 1 for synchronizing the input data 1 with the clock signal to thereby discriminate this input data 1.

In the following description, like or same reference numerals or symbols are used throughout several views to designate corresponding or identical parts.

Referring to FIG. 3, the data discriminating section 3 is constituted of a first D-FF. The D-FF 3 is a synchronous flip-flop which functions by the rising time or falling time of the clock signal input to its C input terminal.

The phase-relation judging section 4 for judging the phase relation between data and the clock comprises an inverter 40, which inverts the polarity of the input data 1, a second D-FF 42, an RB-FF 43 cascade-connected to the second D-FF 42, and an AND gate 45. The AND gate 45 receives the output 41 of the inverter 40 and the Q1 output 44 of the RS-FF 43, and obtains and outputs the logical product of the two inputs 41 and 44.

The clock phase controller 5 is constituted of a T-FF, which is a toggle type flip-flop whose Q output 51 is inverted every time it receives a trigger input pulse.

The clock phase judging section is constituted of an EXOR gate 6. The EXOR gate 6 receives the clock signal 2 at one input and the control signal from the clock phase controller 5 at the other input.

Figure 4:
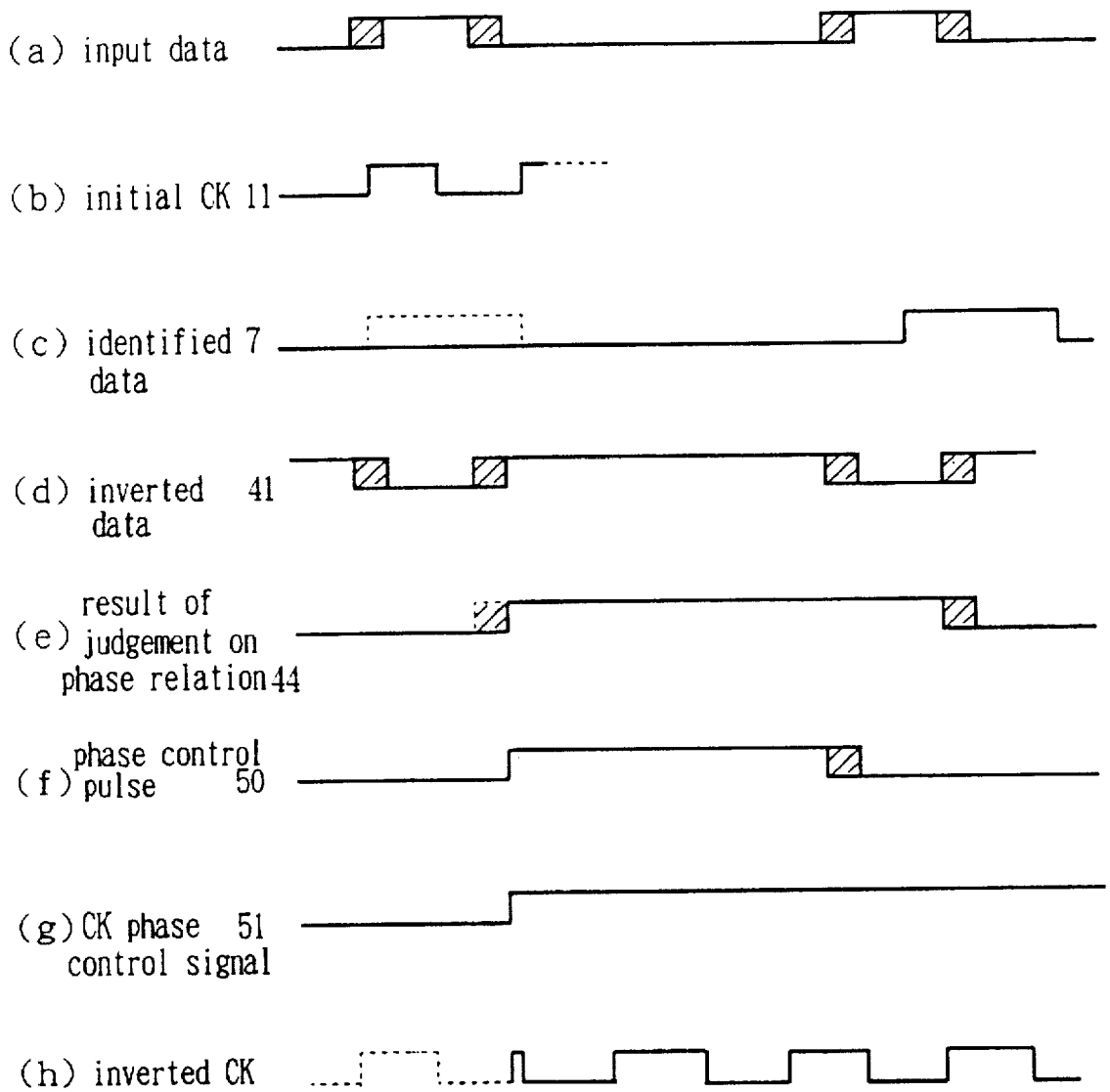
FIGS. 4a–h are time charts for the operation of the embodiment shown in FIG. 3.

FIG. 4 is a time chart for the individual portions along the signal flow in the arrangement in FIG. 3.

With the structure shown in FIG. 3, the input data 1 has undiscriminatable time regions (shaded portions in the diagram) in its time width as shown in FIG. 4(a) depending on the setup/hold time and the state of the clock/data.

Suppose that the initial clock (FIG. 4(b)) is located in such a portion and data "1" is erroneously discriminated as "0" (see the pulse portion of the discriminated data in FIG. 4(c) indicated by the broken line). When the second D-FF 42 is triggered for data discrimination by the rising of the signal (d) in FIG. 4 that is the input data 1 inverted by the inverter 40 (i.e., the falling of the input data 1), the Q output of the D-FF 42 becomes "0."

When the Q1 output and the Q output of the second D-FF 42 are respectively input to the reset input C and the set input D of the RS-FF 43, the Q1 output 44 of the RS-FF 43 becomes "1."

The logical product of the inverted data 41 (see FIG. 5(d)) from the inverter 40 and the Q1 output 44 of the RS-FF 43 in the AND gate 45 becomes a pulse output (phase control pulse 50 of (f) in FIG. 4).

This output of the AND gate 45, when input to the T-FF 5, inverts the Q output of the T-FF 5 (see FIG. 4(g)).

When the clock signal 2 is input to one input of the EXOR gate 6 and the control signal from the T-FF 5 is input to the other input, the clock phase is inverted (FIG. 4(h)).

For the input data 1 which will be discriminated thereafter with a clock having this phase (FIG. 4(h)), the result of the discrimination with the aforementioned inverted data 7 (FIG. 4(c)) becomes "1," indicating that the phase is the proper one. As a result, the phase relation is settled with this phase.

This actually means that the function for discriminating the input data 1 with a clock having the proper phase has been accomplished.

In FIGS. 3 and 4, when one phase is judged as improper for the input clock, the phase of that clock is inverted. This is the same as preparing two clocks with different phases (normal phase and inverted phase).

Figure 5:
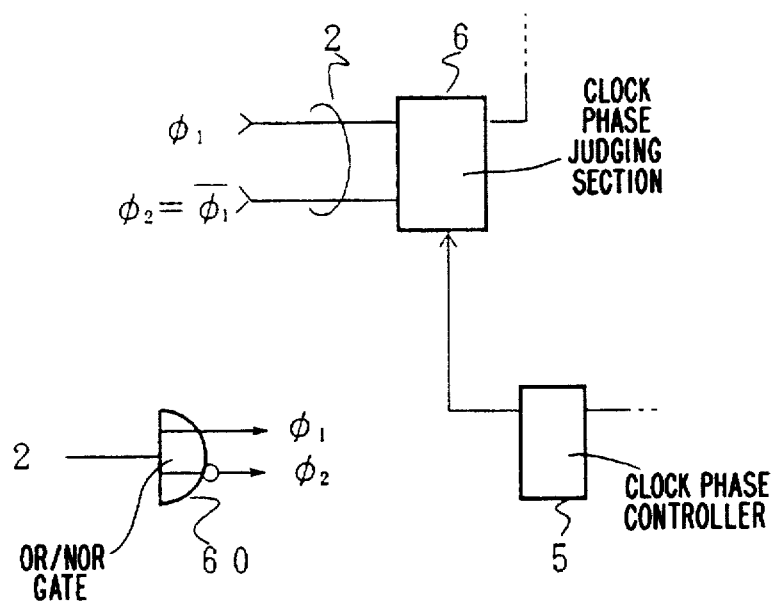
FIG. 5 shows one example of a clock phase judging section 6 which uses a double-phase clock signal source.

FIG. 5 illustrates an embodiment which inputs two types of clocks in an inverted relation with each other through a clock input section 2 and selects the one with the proper phase from those two clocks in accordance with the signal from the clock phase controller 5.

Figure 6:
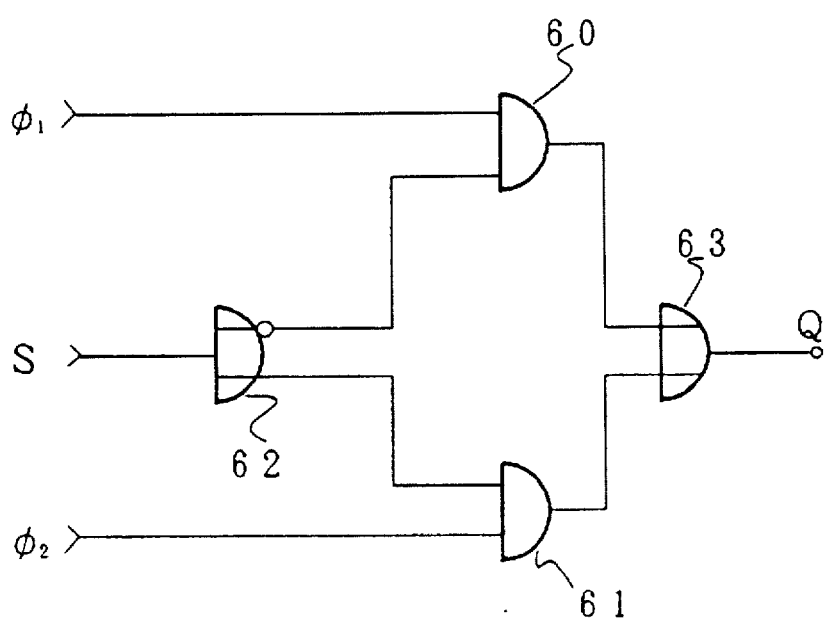
FIG. 6 shows another example of the clock phase judging section 6 constituted of a selector.

In FIG. 5, a multiplexer (MUX) is used as the clock phase judging section 6. This MUX may take the form of a selector as structured as shown in FIG. 6. Input to the S input terminal in FIG. 6 is the control signal from the clock phase controller 5. As the circuit structure for generating the two types of clocks should be simple, an OR/NOR gate 60 as shown in FIG. 5 may be used to provide two types of clocks Φ1 and Φ2 in an inverted relation from the clock input section 2.

In the above-described embodiment, it is assumed that the input data 1 has only one bit of "1" and the preceding and succeeding bits are "0." Actual data however may consist of consecutive 1s.

If the phase of the clock signal 1 is so set that once the phase is settled when the power is given to the receiver, this phase is maintained until the power off, data containing a train of bits "0," "1" and "0" in the preamble portion will be transmitted when the power is given to the transmitter in a transmission/reception system. With this design, the judgment and settling of the phase of the clock can executed surely.

Alternatively, the system may be designed so that a train of signals containing a train of bits "0," "1" and "0" in data will always be transmitted to the receiver from the transmitter.

In those cases, however, it is absolutely essential to include a train of bits "0," "1" and "0" in data, which is a restriction on the system.

Second Embodiment

Figure 7:
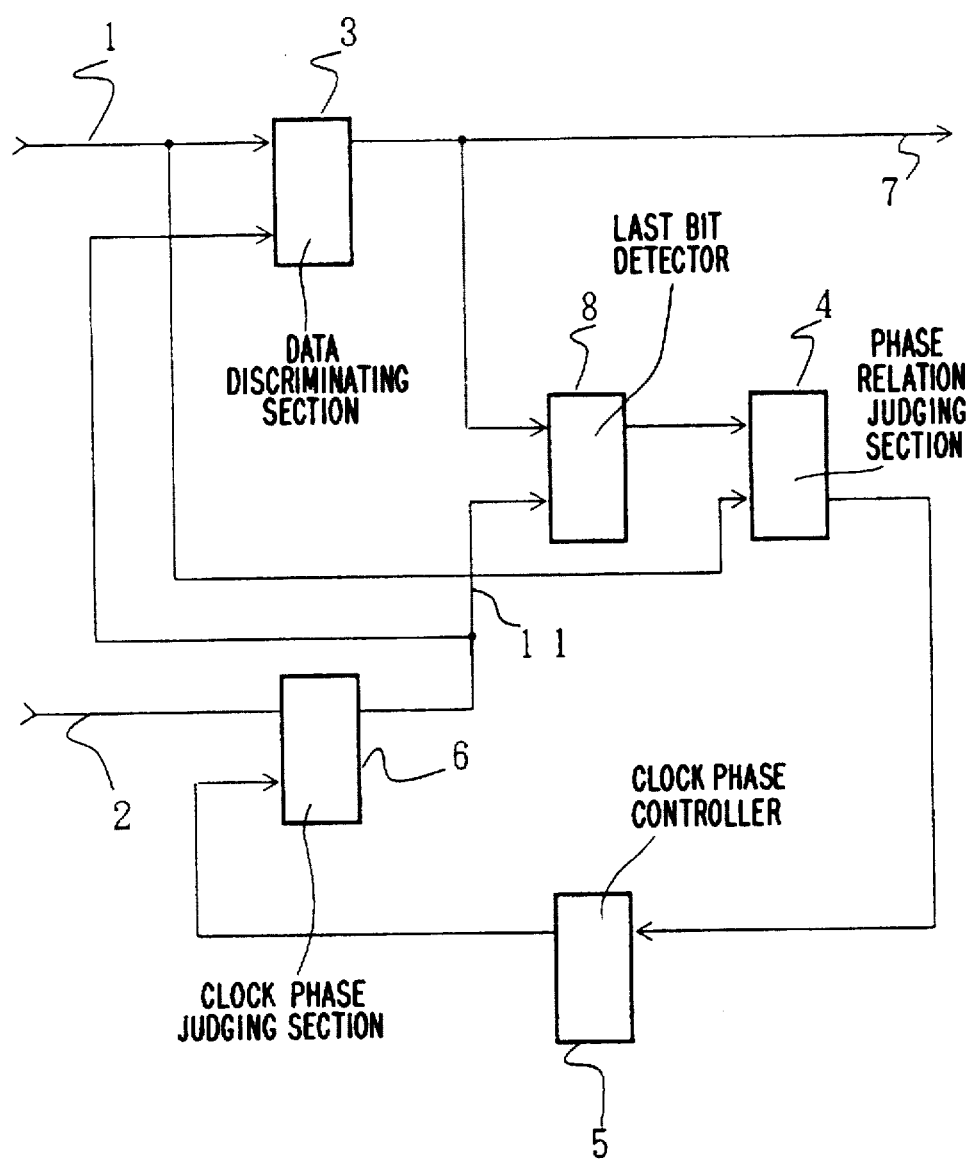
FIG. 7 is a block diagram showing a second embodiment of this invention associated with the principle diagram for clock synchronization in FIG. 1.

FIG. 7 is a block diagram showing a second embodiment of this invention associated with clock synchronization, which is designed to put no restrictions on the transmission/reception system.

The second embodiment has a feature in the provision of a last bit detector 8 between the data discriminating section 3 and the phase-relation judging section 4 as shown in FIG. 7.

When data consists of consecutive 1s, the last bit detector 8 detects only the last one bit in the sequence and inputs it to the phase-relation judging section 4. In this way, the second embodiment can perform the same process as done by the structure shown in FIG. 3.

Figure 8:
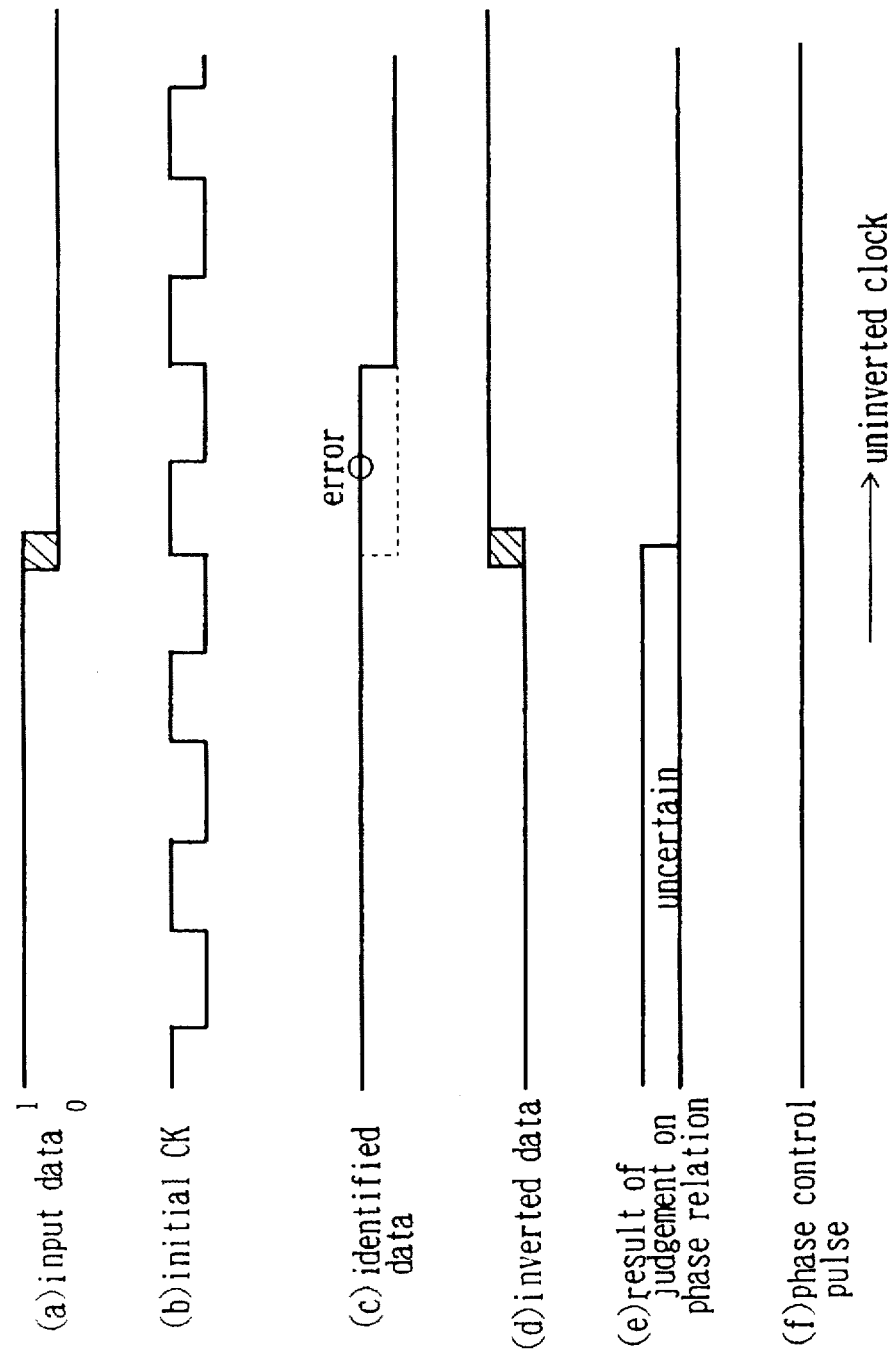
FIGS. 8a–f are time charts for explaining the embodiment shown in FIG. 7.

When there are consecutive 1s in data, the consecutive bits are discriminated as "1" even when the initial clock is located in an improper region. In some cases, therefore, as shown in FIG. 8, the data may be discriminated as "1" (see FIG. 8(c)) even when the initial clock (b) is located in an undiscriminatable region (shaded region in the diagram) where the discrimination of the input data (a) with the initial clock (b) is not probable.

While the correct discrimination appears to have been made, there is actually a likely occurrence of an error. Data discrimination should therefore be controlled so that the input data is discriminated with a clock with the inverted phase, not with the clock with the initial phase.

When data consists of consecutive 1s, only the last bit in the sequence is detected by the last bit detector 8 shown in FIG. 7 and discrimination is carried out with the inverted data delayed by one bit accordingly. In the general operation, therefore, the improper phase relation is judged in the same process as illustrated in FIG. 4, and the clock phase control signal is output from the clock phase controller 5 to invert the clock.

Figure 9:
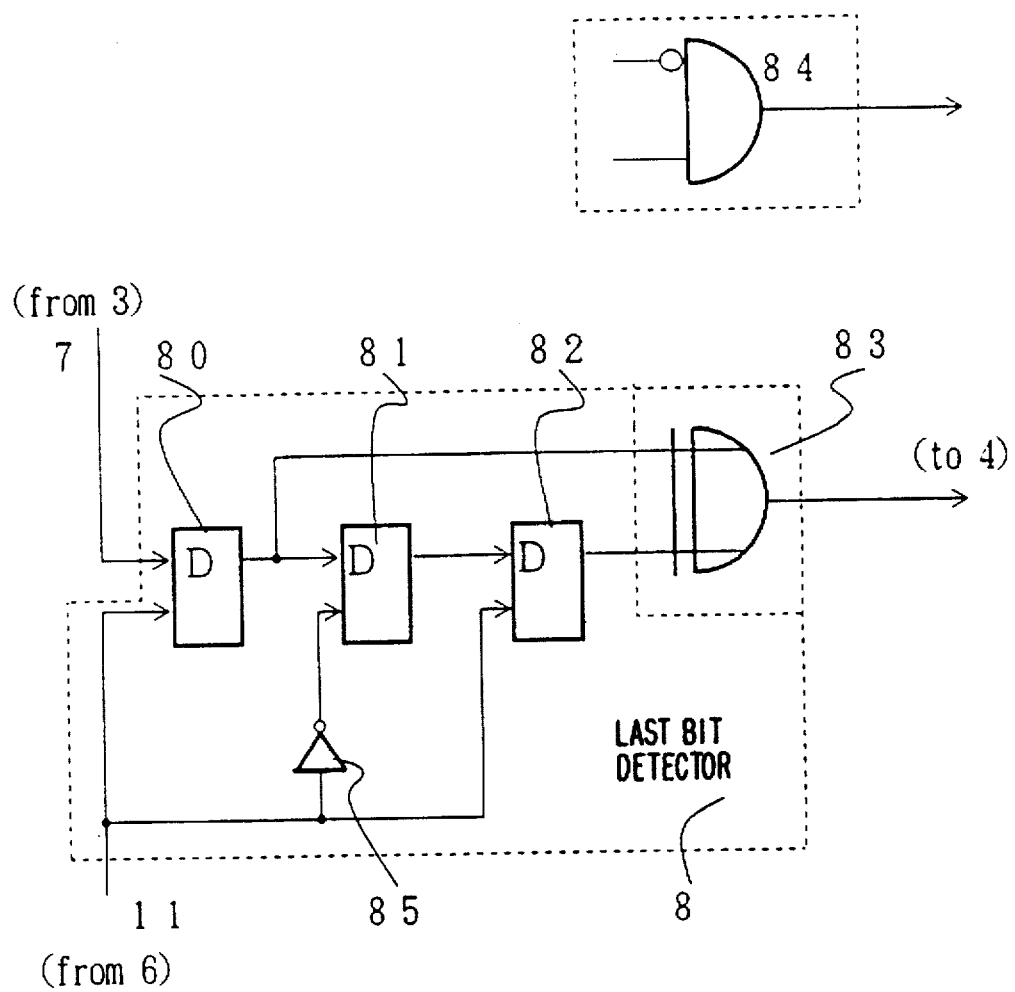
FIG. 9 is a block diagram showing an example of a last bit detector shown in FIG. 7.

FIG. 9 illustrates an example of the structure of the last bit detector 8 having the above-described function.

Figure 10:
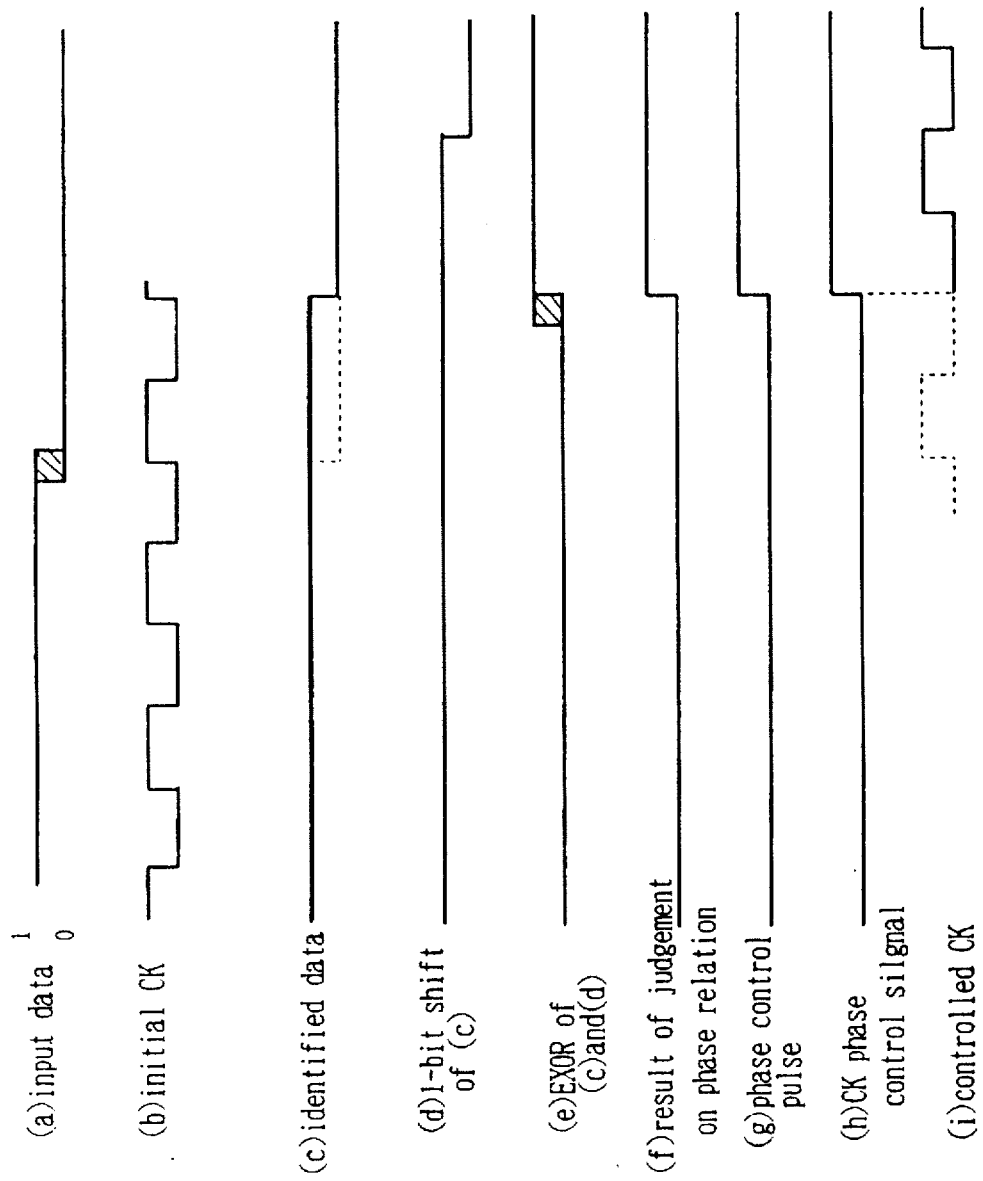
FIGS. 10a–i are time charts for the operation of the embodiment shown in FIG. 9.

FIG. 10 is a time chart for the operation of the embodiment shown in FIG. 9.

As shown in FIG. 9, the discriminated data 7 from the data discriminating section 3 is input to cascade-connected D-FFs 80 to 82. To produce clocks in mutually inverted states, a clock signal 11 is input to the D-FF 81 via an inverter 85 and to the D-FFs 80 and 82 directly. When data is discriminated with such mutually inverted clock signals, the data is delayed by one bit (see FIG. 10(d)).

Accordingly, the 1-bit delayed discriminated data and the undelayed discriminated data 7 are input to an EXOR gate 83. As the input signals to the EXOR gate 83 are identical with a delay of one bit from each other, the output of the EXOR gate 83 becomes a pulse with only one isolated bit, allowing the above-described process to be carried out (see FIG. 10(e)).

The EXOR gate 83 may be replaced with an AND gate 84 having a not input as shown at the upper right portion indicated by a broken-lined block in FIG. 9. More specifically, undelayed discriminated data is input to the not input terminal of the AND gate 84 so that its polarity is inverted.

According to the above-described embodiment, it is possible to output data that has been discriminated with the proper one of the two types of clocks which are in a mutually inverted relation.

In a logic circuit used in an actual receiver or the like, a sync protection circuit for detecting a frame is provided in, for example, a frame synchronizer. Therefore, such a sync protection circuit may also be provided in the data discriminating circuit embodying the present invention.

Third Embodiment

Figure 11:
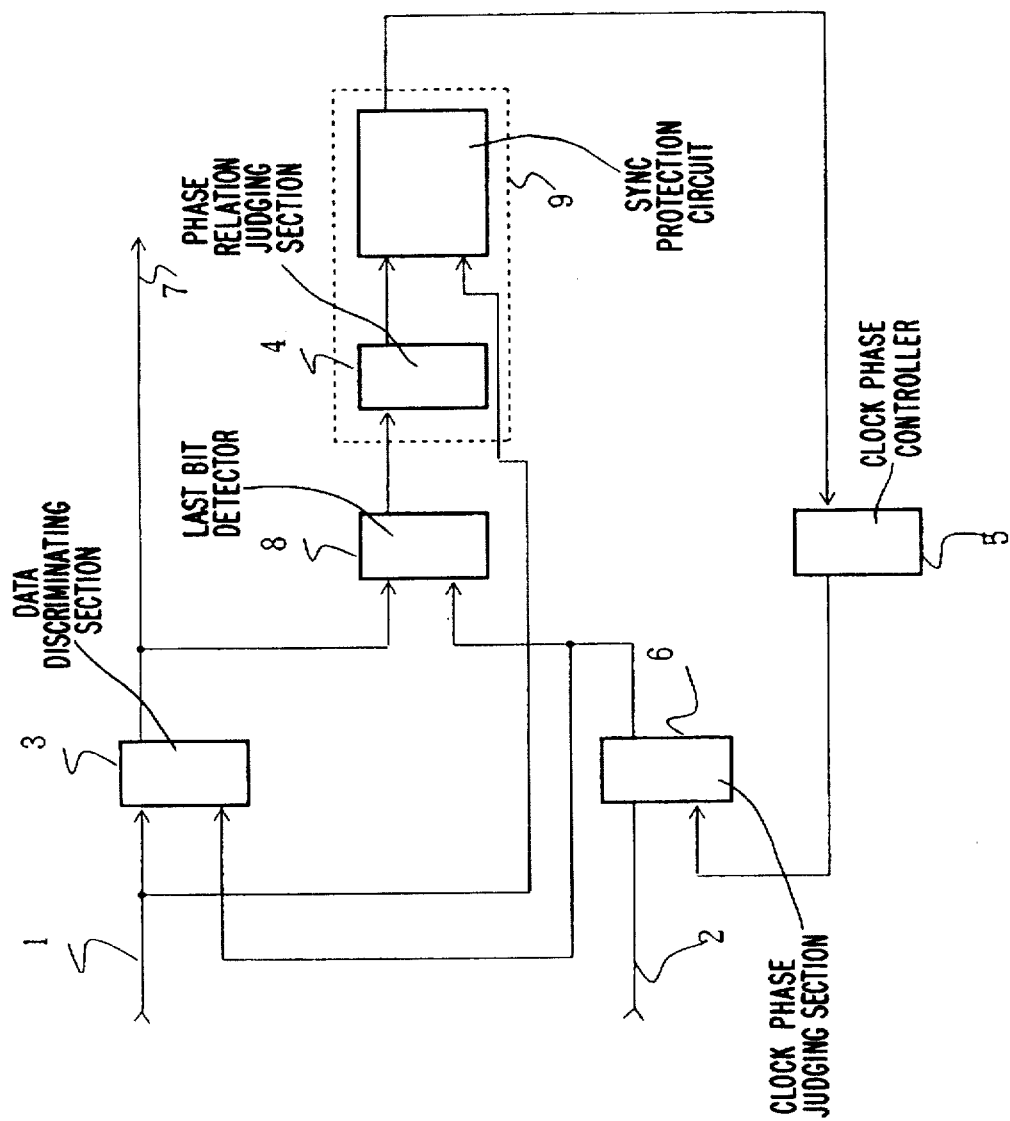
FIG. 11 is a block diagram showing a third embodiment of this invention associated with the principle diagram for clock synchronization in FIG. 1.
Figure 12:
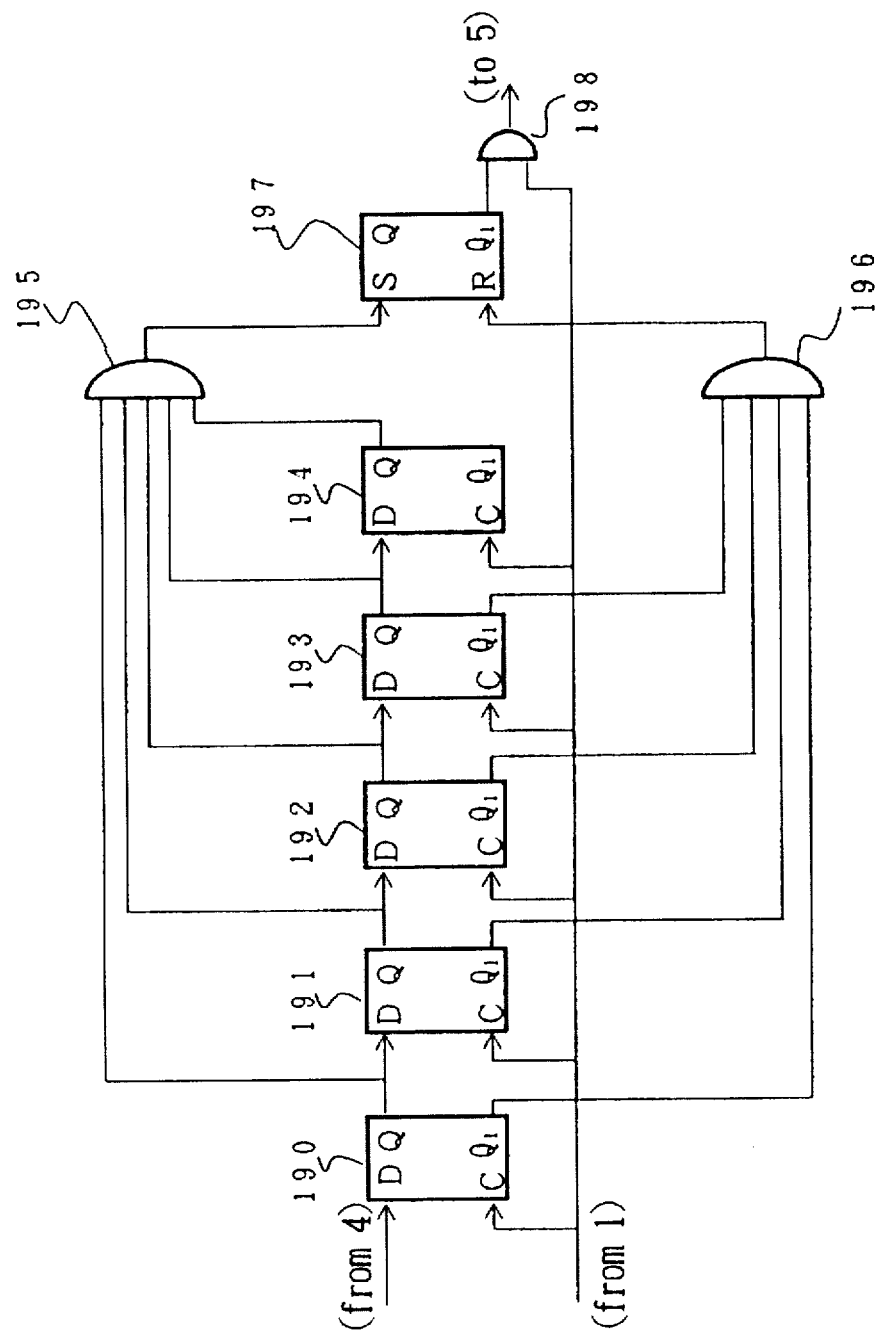
FIG. 12 is a block diagram showing an example of a sync protection circuit 9 shown in FIG. 11.

FIG. 11 illustrates a third embodiment of this invention which is provided with this sync protection circuit. A sync protection circuit 19 is provided at the subsequent stage of the phase-relation judging section 4 in FIG. 11. FIG. 12 is a block diagram showing an example of the sync protection circuit 19.

In FIG. 12, the sync protection circuit 19 includes cascade-connected D-FFs 190 to 194, an AND gate 195 for obtaining the logical product of the Q outputs of those D-FFs, and an AND gate 196 for obtaining the logical product of the Q1 outputs of those D-FFs.

The outputs of the AND gates 195 and 196 are respectively input to the set input S and reset input R of an RS-FF 197. The output of the phase-relation judging section 4 is input to the D input of the D-FF 190, with a clock signal commonly input to the clock input terminals C of the individual D-FFs 190-194.

In the sync protection circuit 19 shown in FIG. 12, the AND gate 195 provides the timing for forward protection while the AND gate 196 provides the timing for backward protection.

The logical product of the Q1 output of the RS-FF 97 and the clock signal is obtained by an AND gate 198 whose output is supplied to the clock phase controller 5.

Fourth Embodiment

Figure 13:
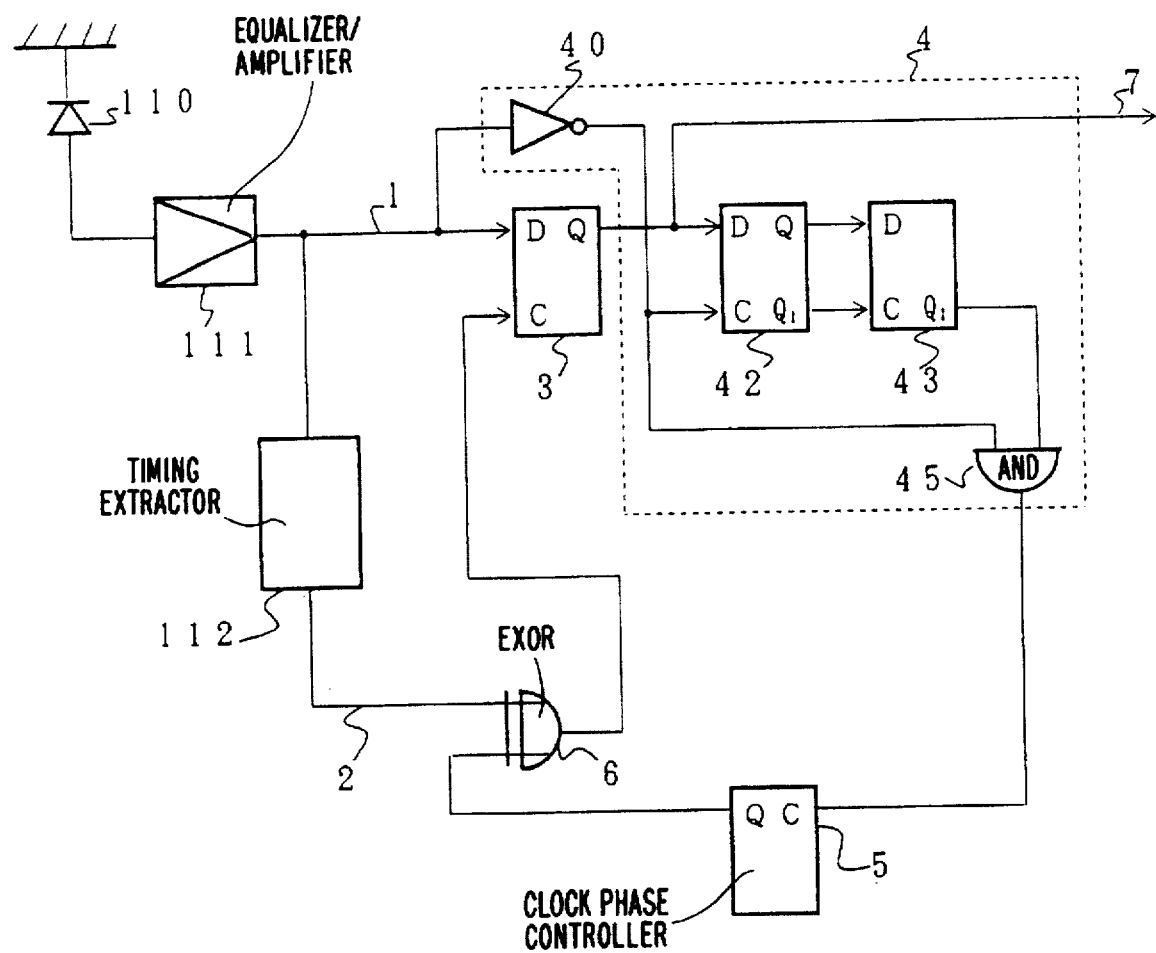
FIG. 13 is a block diagram showing a fourth embodiment of this invention associated with the principle diagram for clock synchronization in FIG. 1.

FIG. 13 is a block diagram showing a fourth embodiment of this invention in which the data discriminating circuit of this invention is adapted for use in an optical receiver.

Received data from an optical receiver, which comprises a light-receiving diode 110 and an equalizer/amplifier 111, is input as the input data 1 to the D terminal of the data discriminating section 3. At the same time, the signal from the equalizer/amplifier 111 is sent to a timing extractor 112. A timing signal is extracted there and is input as the clock signal 2 to one input of the EXOR gate 6 which is the clock phase judging section.

As described above, this data discriminating circuit according to this invention is constituted only of a logic circuit, data is discriminated with the proper one of two types of clock signals in a mutually inverted relation.

Fifth Embodiment

Figure 14:
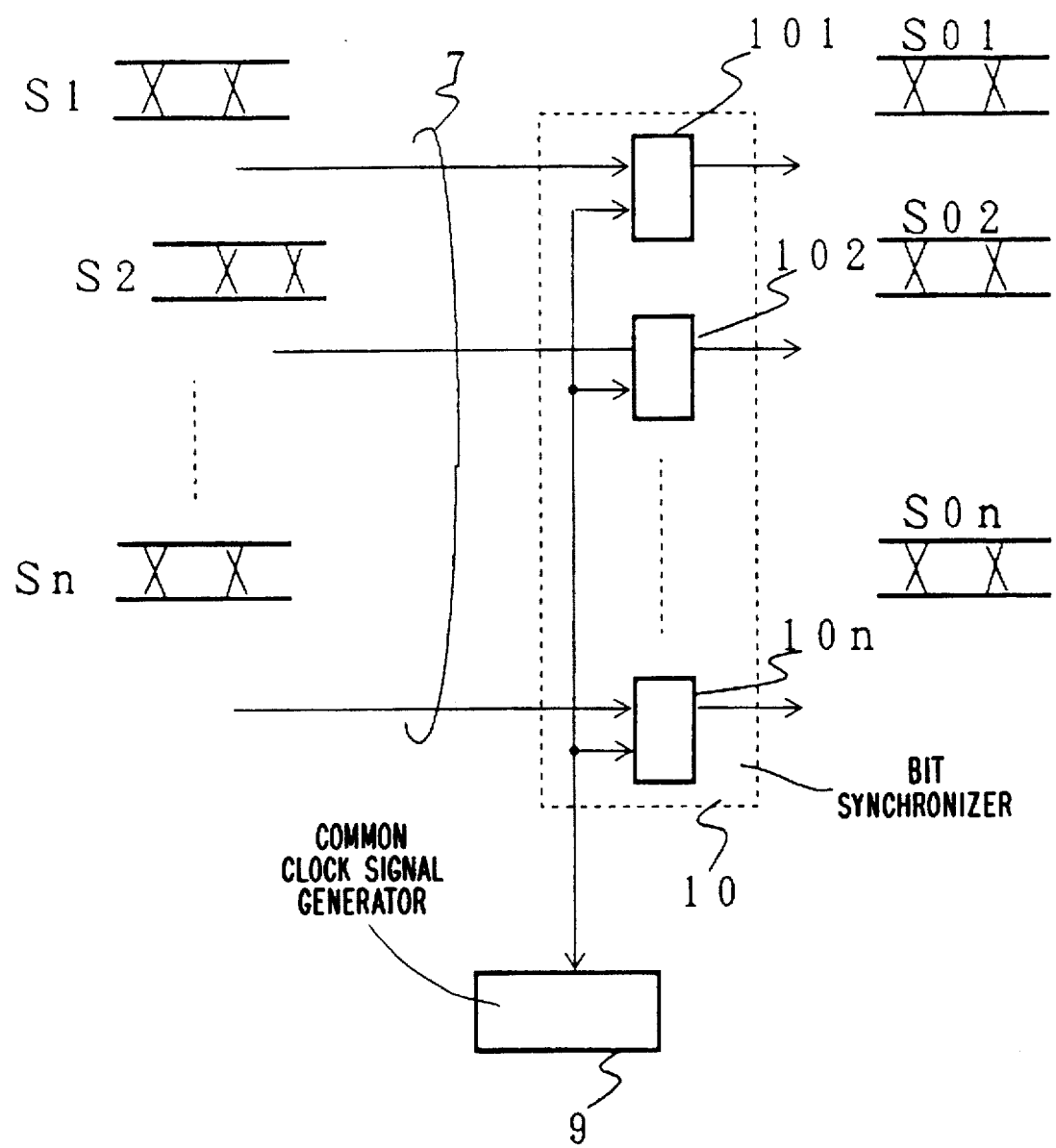
FIG. 14 is a block diagram showing a fifth embodiment of this invention associated with the principle diagram for bit synchronization in FIG. 2.

FIG. 14 is a block diagram showing a fifth embodiment of this invention which is designed to allow the receiver in a parallel data transmission system to output the received parallel data with the bits aligned for the individual channels.

In FIG. 14, which is associated with the principle diagram of FIG. 2, some parts are not illustrated. Although not shown in FIG. 14, the data discriminating circuits 8-1 to 8-n are actually provided for respective channels as shown in FIG. 2.

Reference numeral "7" in FIG. 14 indicates discriminated data from each data discriminating circuit.

S1, B2 and Sn are parallel discrimination signals from the associated data discriminating circuits. In this example, the bit timing differs channel by channel. The purpose of this embodiment is to align the bits of data between the individual channels in the parallel data transmission.

It is the bit synchronizer 10 which has such a function. The bit synchronizer 10 has D-FFs 101,102, . . . , and 10n in association with the individual discriminated data outputs 7. The clock signal from the clock signal is commonly supplied to the D-FFs 101 to 10n. Accordingly, each discriminated data 7 is discriminated again at the timing of the clock signal supplied from the clock signal generator 9.

As a result, the bit synchronizer 10 outputs parallel discriminated data SO1, S02, . . . , and SOn whose phases are synchronized with that of the clock signal, thus accomplishing bit-by-bit synchronization.

Figure 15:
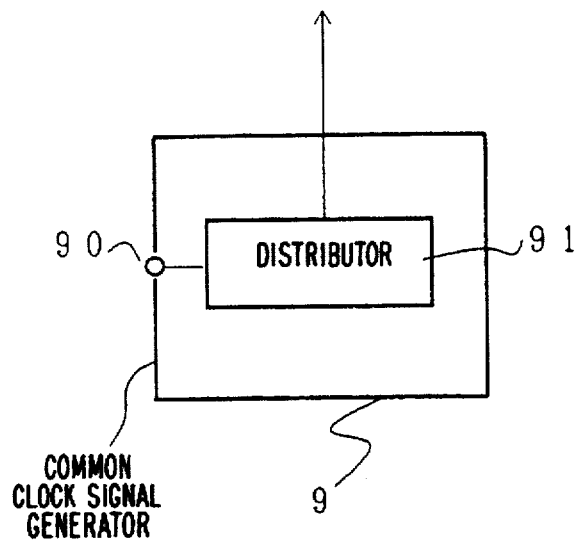
FIG. 15 shows an example of a clock generator 9 shown in FIG. 14.

There are different methods of producing the clock in the clock signal generator 9 as shown in FIGS. 15 to 18. In FIG. 15, a distributor 91 in the clock signal generator 9 distributes a clock signal, input to a clock input section 90, to the clock input terminals of the individual D-FFs in FIG. 14.

Figure 16:
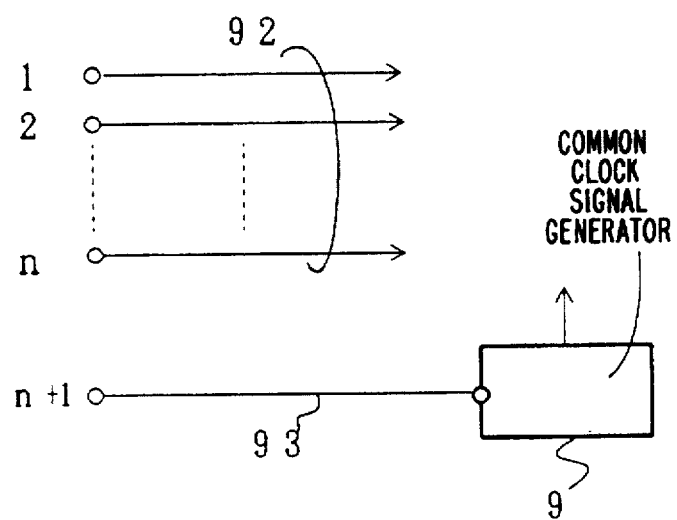
FIG. 16 illustrates a first method of generating a clock signal.

In FIG. 16, the (n+1)-th transmission passage 93 is provided as separate from transmission passages 92 associated with a plurality of channels 1 to n, and a clock signal is sent to the receiver from the transmitter over this separate transmission passage. The clock signal generator 9 distributes the received clock signal to the clock input terminals of the D-FFs in the synchronizer 10 which are associated with the individual channels.

Figure 17:
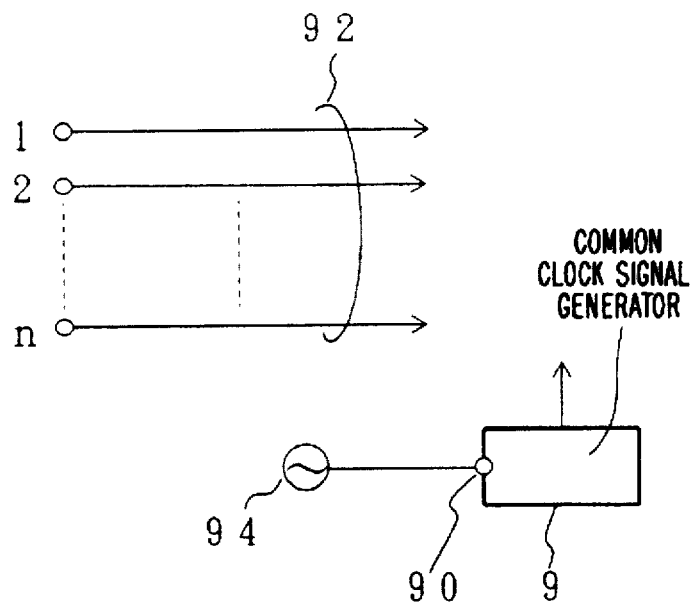
FIG. 17 illustrates a second method of generating a clock signal.

In FIG. 17, a clock signal source 94 is provided on the receiver side. The clock signal generator 9 receives a clock signal from this source 94, and distributes the clock signal to the clock input terminals of the D-FFs in the synchronizer 10 which are associated with the individual channels.

Figure 18:
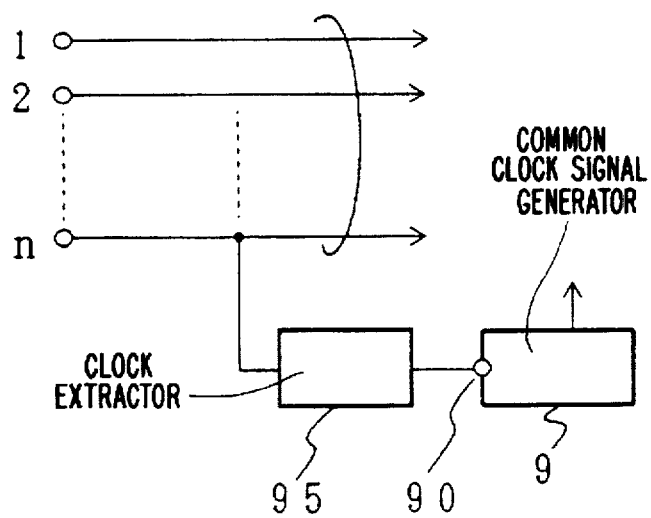
FIG. 18 illustrates a third method of generating a clock signal.

In FIG. 18, a clock signal is extracted from at least one of transmission passages associated with a plurality of channels.

More specifically, a clock signal extractor 95 is provided and is connected at least one transmission passage. In FIG. 18, the clock extractor 95 is connected to the n-th channel. Accordingly, a clock signal can be extracted from the signal that is sent over the transmission passage n and can be sent to the input terminal 90 of the clock signal generator 9.

Sixth Embodiment

Suppose that there are two types of clocks with different phases which are used in data discrimination in the data discriminating section 3. If it is possible to check which clock signal has the finally settled phase, the same process as described above can be executed by performing a process of determining whether or not data discrimination should be conducted again with a clock.

Figure 19:
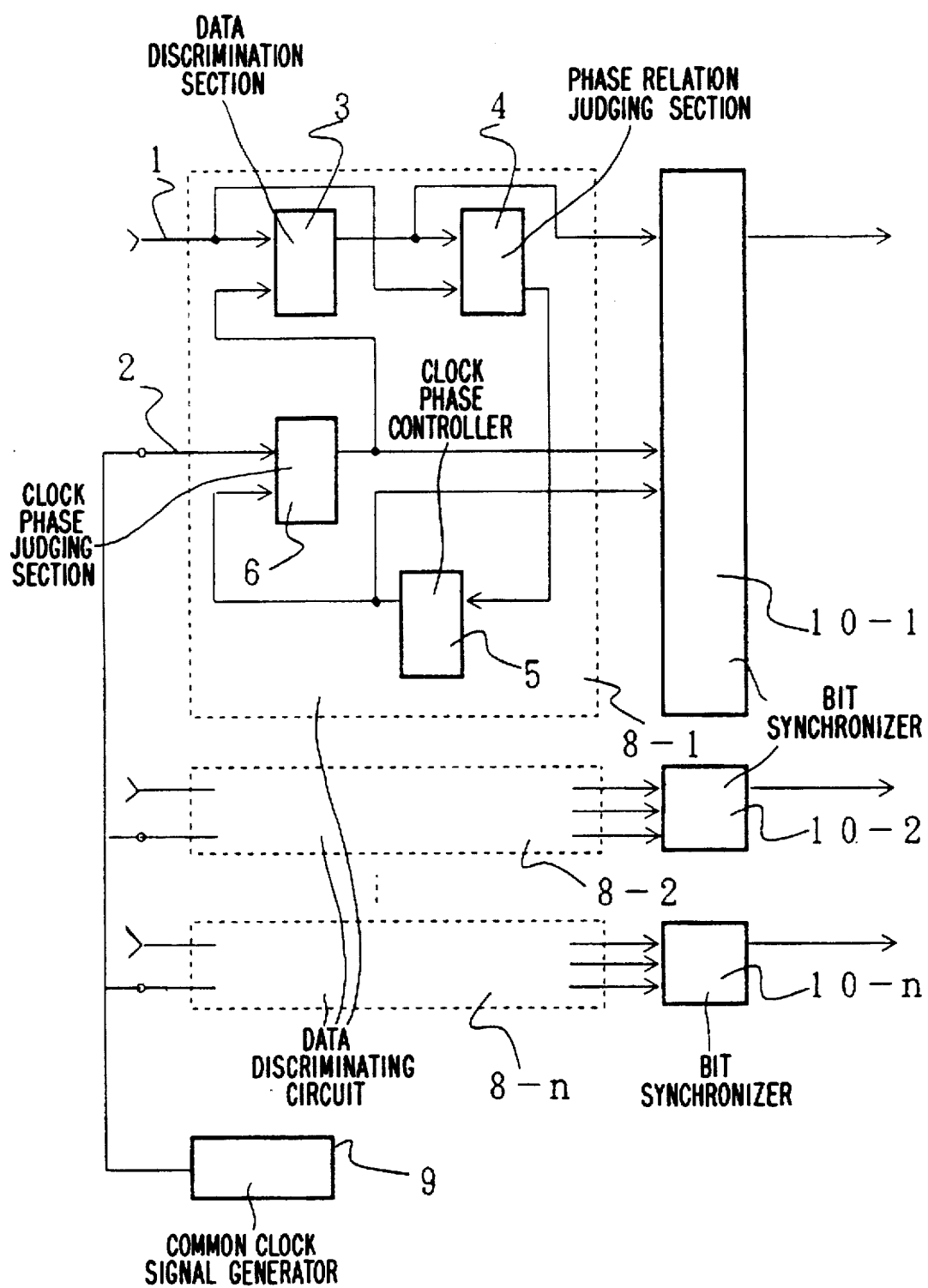
FIG. 19 is a block diagram showing a sixth embodiment of this invention associated with the principle diagram for bit synchronization in FIG. 2.

A sixth embodiment of this invention as illustrated in FIG. 19 can accomplish this function. In FIG. 19, specific bit synchronizers 10-1 to 10-n are provided in association with the data discriminating circuits.

The discriminated data 7 output from the data discriminating section 3, the discrimination clock from the clock phase judging section 6 and the clock phase control information from the clock phase controller 5 are input to each of the bit synchronizers 10-1 to 10-n. Bit synchronization has only to be carried out using the clock phase control information from the clock phase controller 5 and the discrimination clock from the clock phase judging section 6.

This structure permits the detection of which one of two clock phases (denoted by A and B for convenience' sake) using the clock phase control information from the clock phase controller 5, and if the discrimination of the data has been settled with the phase A, that discriminated data is output directly from the bit synchronizers 10-1 to 10-n.

If the discrimination of the data has been settled with the phase B, the data should be discriminated again with the clock having the phase A. Accordingly, the data output from the bit synchronizers 10-1 to 10-n are all synchronized with the clock having the phase A.

This design can accomplish bit-by-bit synchronization. A specific example of the synchronizer is illustrated in FIG. 20.

Figure 20:
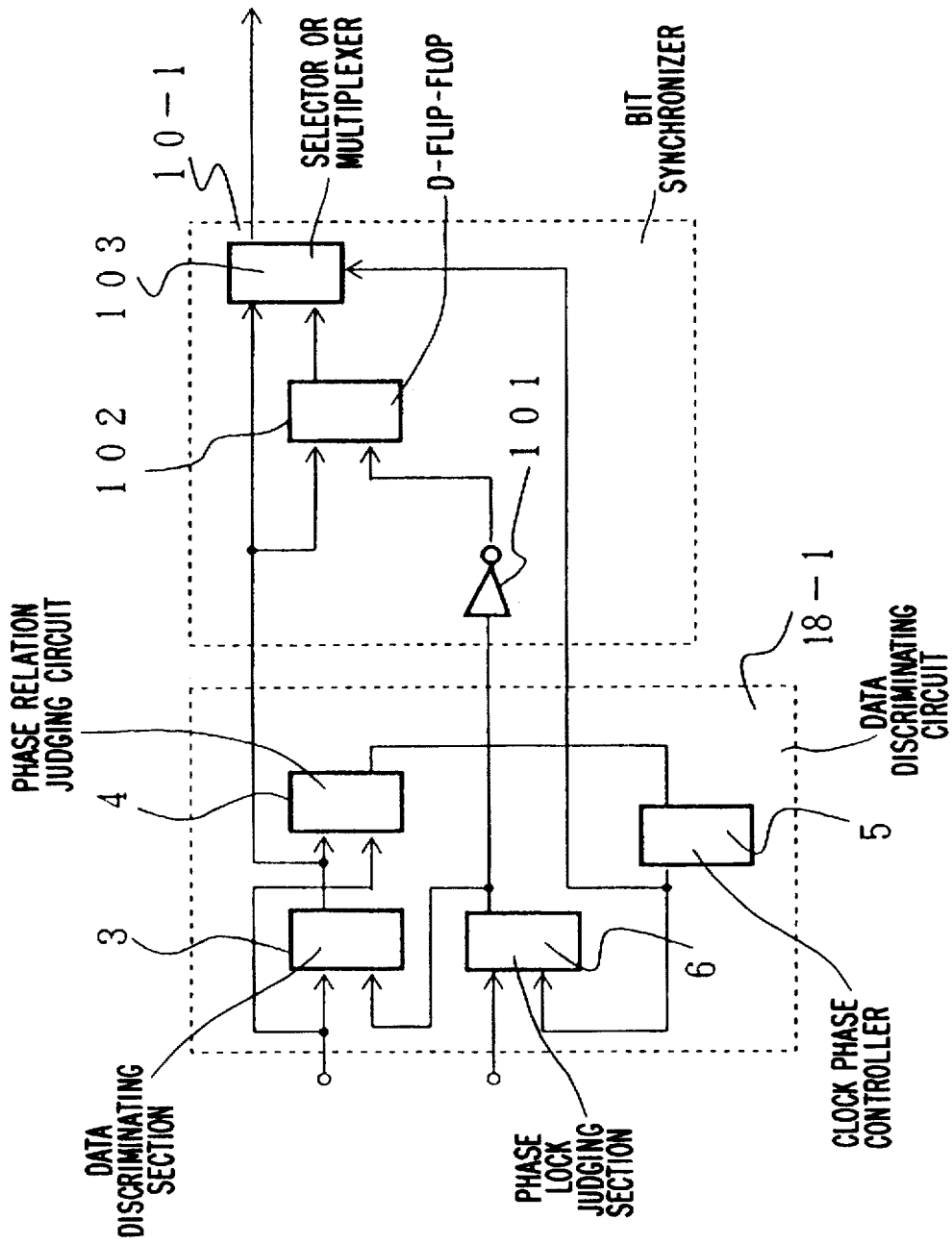
FIG. 20 is a diagram showing an example of a synchronizer in FIG. 19.

FIG. 20 shows a single data discriminating circuit 8-1 and a single synchronizer 10-1 provided for that data discriminating circuit l8-1.

The synchronizer 10-1 has an inverter 101, a D-FF 102 and a selector or multiplexer 103.

The selector multiplexer 103 receives the discriminated data 7 from the data discriminating section 3 and the output of the D-FF 102.

The discriminated data 7 and the clock signal from the clock phase judging section inverted by the inverter 101 are input to the D-FF 102.

The control signal from the clock phase controller 5 is input to the selector or multiplexer 103. In response to this control signal, the selector or multiplexer 103 selectively outputs either the discriminated data 7 or the output of the D-FF 102.

In this manner, parallel data transmitted in parallel can be discriminated with a clock having the proper phase or bit-by-bit synchronization can be performed on the discriminated data.

Seventh Embodiment

Figure 21:
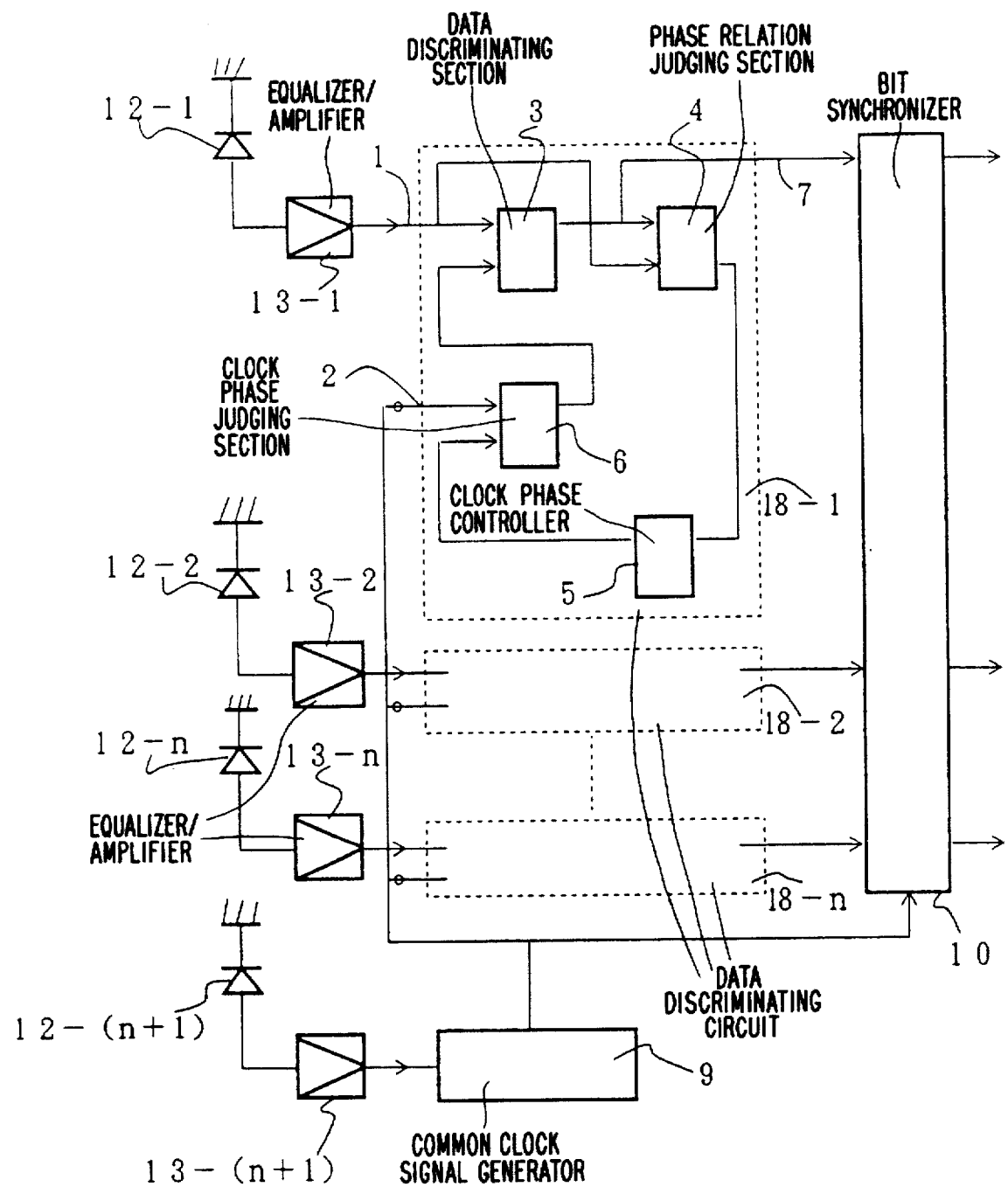
FIG. 21 is a block diagram showing a seventh embodiment of this invention associated with the principle diagram for bit synchronization in FIG. 2.

FIG. 21 illustrates a seventh embodiment of this invention as applied to an optical parallel data receiver.

In FIG. 21, reference numerals "l8-1" to "l8-n" denote data discriminating circuits which are the same as those already explained above. Reference numerals "9" and "10" denote a clock signal generator and a bit synchronizer, respectively.

Reference numerals "12-1" and "13-1" denote a photodiode and an equalizer/amplifier which constitute an optical receiver. The same optical receiver is provided for each of the data discriminating circuits l8-1 to l8-n.

An electric signal corresponding to the optical signal received from each equalizer/amplifier 13-1, . . . or 13-n of the associated optical receiver is input as a data input signal 1 to the associated data discriminating circuit.

Reference numerals "12-(n+1)" and "13-(n+1)" denote a photodiode and an equalizer/amplifier which constitute a timing-signal receiver.

The photodiode 12-(n+1) receives the optical signal corresponding to the timing signal, converts it into an electric signal and sends the electric signal to the equalizer/amplifier 13-(n+1). This equalizer/amplifier 13-(n+1) amplifies the received signal to a predetermined level before supplying it to the clock signal generator 9.

The clock signal from the clock signal generator 9 is distributed to the clock input sections 2 of the clock phase judging sections 6 of the data discriminating circuits l8-1 to l8-2. At the same time the clock signal generator sends the clock signal to the synchronizer 10.

Having the same function as has already been described above, therefore, the synchronizer 10 can output parallel data corresponding to the optical signals, transmitted in parallel, in bit-by-bit synchronism with the clock signal from the clock signal generator 9.

In short, according to this invention, the data discriminating circuits for performing signal discrimination in a receiver in a digital signal transmission system can be constituted only of a logic circuit.

It is therefore possible to accomplish a low-cost data discriminating circuit constituted of a gate array or the like and an optical receiver using this data discriminating circuit. This invention can thus provide an optical receiver with a simple circuit structure in a close range optical transmission system such as an optical subscriber system.

According to this invention, data discriminating circuits for performing signal discrimination and bit synchronization in a parallel data receiver in a parallel digital signal transmission system can also be accomplished only by a logic circuit.

From the above, it is apparent that this invention can greatly contribute to accomplishing a parallel receiver with a simple circuit structure in an optical parallel transmission system, such as transmission between machines.

The present invention may be embodied in other specific forms without departing from the spirit or essential characteristics thereof.

The present embodiments are therefore to be considered in all respect as illustrative and not restrictive, the scope of the invention being indicated by the appended claims rather than by the foregoing description, and all changes, which come within the meaning and range of equivalency of the claims, are therefore intended to be embraced therein.

What is claimed is:

1. A data discriminating circuit comprising:

a data discriminating section discriminating input data in synchronism with a clock signal and outputting resultant data as discriminated data;

a phase-relation judging section receiving the input data and the discriminated data and judging a phase relation therebetween;

a clock phase controller producing a phase control signal to control an initially-determined phase of the clock signal, based on an output of the phase-relation judging section; and a clock phase judging section determining a phase of the clock signal and altering the initially-determined phase of the clock signal in accordance with the phase control signal from the clock phase controller.

2. The data discriminating circuit according to claim 1, wherein the phase-relation judging section discriminates the discriminated data at a falling edge of the input data.

3. The data discriminating circuit according to claim 1, further comprising a sync protection circuit on an output side of the phase-relation judging section.

4. A data discriminating circuit comprising:

a data discriminating section for discriminating input data in synchronism with a clock signal and outputting resultant data as discriminated data;

a phase-relation judging section for receiving the input data and the discriminated data and judging the phase relation therebetween;

a clock phase controller for producing a phase control signal to control an initially-determined phase of the clock signal, based on an output of the phase-relation judging section; and a clock phase judging section for determining a phase of the clock signal and altering the initially-determined phase of the clock signal in accordance with the phase control signal from the clock phase controller, wherein the data discriminating section comprises a first D-FF (flip-flop) supplied with the input data and the clock signal, and the phase-relation judging section comprises an inverter for inverting the input data, a second D-FF supplied with an output of the first D-FF and the inverted input data for discriminating the output of the first D-FF at a rising edge of the inverted input data, corresponding to a falling edge of the input data before inversion, a third D-FF cascade-connected to the second D-FF, which is set or reset by a discrimination output of the second D-FF, and an AND gate for obtaining a logical product of the inverted input data and an output of the third D-FF.

5. The data discriminating circuit according to claim 4, wherein the clock phase controller comprises a T-FF supplied with an output of the AND gate, and the clock phase judging section comprises an EXOR gate supplied with an output of the T-FF and the clock signal.

6. The data discriminating circuit according to claim 4, further comprising a last bit detector, provided between the data discriminating section and the second D-FF, for detecting a last bit of "1" when the input data contains consecutive 1s and inputting the last bit of "1" to the second D-FF, the last bit detector including third through fifth D-FFs, which are cascade-connected, an EXOR gate having two inputs, one of which is supplied with an output of the third D-FF, and the other of which is supplied with an output of the fifth D-FF, and an inverter, through which the clock signal is supplied to the fourth D-FF.

7. The data discriminating circuit according to claim 5, wherein the input data to be input to the data discriminating section is an electric signal obtained by photoelectric conversion of an optical signal by an optical receiver; and the clock signal to be input to the EXOR gate is extracted from the input data by a timing circuit.

8. The data discriminating circuit according to claim 4, further comprising a last bit detector, provided between the data discriminating section and the second D-FF, for detecting a last bit of "1" when the input data contains consecutive 1s and inputting the last bit of "1" to the second D-FF, the last bit detector including third through fifth D-FFS, which are cascade-connected, an AND gate having two inputs, one of which is NOT input and is supplied with an output of the third D-FF, and the other of which is supplied with an output of the fifth D-FF, and an inverter through which the clock signal is supplied to the fourth D-FF.

9. The data discriminating circuit according to claim 4, further comprising a last bit detector, provided between the data discriminating section and the second D-FF, for detecting a last bit of "1" when the input data contains consecutive 1s and inputting the last bit of "1" to the second D-FF, the last bit detector including third through fifth D-FFS, which are cascade-connected, an EXOR gate having two inputs, one of which is supplied with an output of the third D-FF, and the other of which is supplied with an output of the fifth D-FF, and an inverter, through which the clock signal is supplied to the fourth D-FF.

10. The data discriminating circuit according to claim 4, wherein the clock phase controller comprises a T-FF supplied with an output of the AND gate, and the clock phase judging section comprises an EXOR gate supplied with an output of the T-FF and the clock signal.

11. The data discriminating circuit according to claim 10, wherein the input data to be input to the data discriminating section is an electric signal obtained by photoelectric conversion of an optical signal by an optical receiver; and the clock signal to be input to the EXOR gate is extracted from the input data by a timing circuit.

12. A data discriminating circuit comprising:

a data discriminating section for discriminating input data in synchronism with a clock signal and outputting resultant data as discriminated data;

a phase-relation judging section for receiving the input data and the discriminated data and judging the phase relation therebetween;

a clock phase controller for producing a phase control signal to control an initially-determined phase of the clock signal, based on an output of the phase-relation judging section;

a clock phase judging section for determining a phase of the clock signal and altering the initially-determined phase of the clock signal in accordance with the phase control signal from the clock phase controller; and a last bit detector, provided between the data discriminating section and the phase-relation judging section, for detecting a last bit of "1" when the input data contains consecutive 1s and inputting the last bit of "1" to the phase-relation judging section.

13. The data discriminating circuit according to claim 12, further comprising a sync protection circuit on an output side of the phase-relation judging section.

14. The data discriminating circuit according to claim 13, wherein the sync protection circuit includes:

a predetermined number of stages of cascade-connected D-FFs;

a first AND gate for obtaining a logical product of Q outputs of the D-FFs;

a second AND gate for obtaining a logical product of Q1 outputs of the D-FFs which are logical inverted outputs with respect to the Q outputs;

an RS-FF having a set (S) input terminal and a reset (R) input terminal respectively supplied with outputs of the first and second AND gates, whereby an output of the last bit detector is input to a first stage of D-FF and a clock signal is commonly input to the other stages of D-FFs, allowing the first AND gate to perform forward protection and allowing the second AND gate to perform backward protection.

15. A data discriminating circuit comprising:

a data discriminating section for discriminating input data in synchronism with a clock signal and outputting resultant data as discriminated data;

a phase-relation judging section for receiving the input data and the discriminated data and judging the phase relation therebetween;

a clock phase controller for producing a phase control signal to control an initially-determined phase of the clock signal, based on an output of the phase-relation judging section; and a clock phase judging section for determining a phase of the clock signal and altering the initially-determined phase of the clock signal in accordance with the phase control signal from the clock phase controller, wherein the clock phase judging section receives two clock signals having a predetermined phase difference therebetween, and selectively outputs one of the two clock signals based on the phase control signal from the clock phase controller.

16. The data discriminating circuit according to claim 15, wherein the two clock signals having the predetermined phase difference therebetween have a mutually inverted phase relation.

17. The data discriminating circuit according to claim 16, wherein the two clock signals having a mutually inverted phase relation are two signals obtained as outputs of an OR/NOR gate when one clock signal is supplied thereto.

18. The data discriminating circuit according to claim 15, wherein the clock phase judging section comprises a multiplexer or a selector.

19. A parallel data receiver comprising:

a plurality of data discriminating circuits provided in association with a plurality of input signals transmitted in parallel;

a common clock signal generator; and a bit synchronizer for receiving discriminated data from the plurality of data discriminating circuits and providing bit synchronization between the discriminated data, with a clock signal from the common clock signal generator taken as a reference, each of the plurality of data discriminating circuits including, a data discriminating section for discriminating input data in synchronism with a clock signal and outputting resultant data as discriminated data, a phase-relation judging section for receiving the input data and the discriminated data and judging a phase relation therebetween, a clock phase controller for producing a phase control signal to control an initially-determined phase of the clock signal, based on an output of the phase-relation judging section, and a clock phase judging section for determining a phase of the clock signal and altering the initially-determined phase of the clock signal in accordance with the phase control signal from the clock phase controller.

20. The parallel data receiver according to claim 19, further comprising a sync protection circuit on an output side of the phase-relation judging section.

21. The parallel data receiver according to claim 19, wherein the common clock signal generator has an external clock input section for receiving an external clock signal and a clock signal distributor for distributing the external clock signal to the plurality of data discriminating circuits.

22. The parallel data receiver according to claim 21, wherein the external clock signal input to the external clock input section is transmitted over a parallel transmission passage, which is provided separate from parallel transmission passages for transmitting the plurality of input signals in parallel.

23. The parallel data receiver according to claim 24, wherein the external clock signal is supplied from a separate

17 clock signal source provided in the receiver to the external clock input section.

24. The parallel data receiver according to claim 21, further comprising a timing circuit for extracting a timing signal from an input signal transmitted over one of parallel transmission passages for transmitting the plurality of input signals in parallel, and for inputting the extracted timing signal to the external clock input section as the external clock signal.

25. The parallel data receiver according to claim 19, wherein the bit synchronizer has a plurality of D-FFs provided in association with the plurality of data discriminating circuits, and discriminates the discriminated data input from the plurality of data discriminating circuits with a common clock signal from the clock signal generator.

26. The parallel data receiver according to claim 19, wherein the phase-relation judging section discriminates the discriminated data at a falling edge of the input signal.

27. A parallel data receiver comprising:

a plurality of data discriminating circuits provided in association with a plurality of input signals transmitted in parallel;

a common clock signal generator; and a bit synchronizer for receiving discriminated data from the plurality of data discriminating circuits and providing bit synchronization between the discriminated data, with a clock signal from the common clock signal generator taken as a reference, each of the plurality of data discriminating circuits including, a data discriminating section for discriminating input data in synchronism with a clock signal and outputting resultant data as discriminated data, a phase-relation judging section for receiving the input data and the discriminated data and judging a phase relation therebetween, a clock phase controller for producing a phase control signal to control an initially-determined phase of the clock signal, based on an output of the phase-relation judging section, and a clock phase judging section for determining a phase of the clock signal and altering the initially-determined phase of the clock signal in accordance with the phase control signal from the clock phase controller, wherein the data discriminating section comprises a first D-FF (flip-flop) supplied with the input data and the clock signal, and the phase-relation judging section comprises an inverter for inverting the input data, a second D-FF supplied with an output of the first D-FF and the inverted input data for discriminating the output of the first D-FF at a rising edge of the inverted input data, corresponding to a falling edge of the input data before inversion, a third D-FF cascade-connected to the second D-FF, which is set or reset by a discrimination output of the second D-FF, and an AND gate for obtaining a logical product of the inverted input data and an output of the third D-FF.

28. The parallel data receiver according to claim 27, further comprising a last bit detector, provided between the data discriminating section and the second D-FF, for detecting a last bit of "1" when the input data contains consecutive 1s and inputting the last bit of "1" to the second D-FF, the last bit detector including third through fifth D-FFs which are cascade-connected, an EXOR gate having two inputs,

18 one of which is supplied with an output of the third D-FF, and the other of which is supplied with an output of the fifth D-FF, and an inverter through which the clock signal is supplied to the fourth D-FF.

29. The parallel data receiver according to claim 27, further comprising a last bit detector, provided between the data discriminating section and the second D-FF, for detecting a last bit of "1" when the input data contains consecutive 1s and inputting the last bit of "1" to the second D-FF, the last bit detector including third through fifth D-FFS, which are cascade-connected, an AND gate having two inputs, one of which is NOT input and is supplied with an output of the third D-FF, and the other of which is supplied with an output of the fifth D-FF, and an inverter through which the clock signal is supplied to the fourth D-FF.

30. The parallel data receiver according to claim 27, wherein the clock phase controller comprises a T-FF supplied with an output of the AND gate, and the clock phase judging section comprises an EXOR gate supplied with an output of the T-FF and a clock signal.

31. The parallel data receiver according to claim 30, wherein the input data to be input to the data discriminating section is an electric signal obtained by photoelectric conversion of an optical signal by an optical receiver; and the clock signal to be input to the EXOR gate is generated by the clock signal generator based on a timing acquired by converting a light clock signal into an electric signal by another optical receiver.

32. The parallel data receiver according to claim 27, wherein the bit synchronizer comprises a plurality of synchronizer circuits, each being provided for each of the plurality of data discriminating circuits, and the clock signal from the common clock signal generator is input to the first D-FF of each of the plurality of data discriminating circuits.

33. The parallel data receiver according to claim 32, wherein each of the synchronizer circuits has an inverter, a D-FF for discriminating an output data from the data discriminating section with a clock signal input via the inverter from the clock phase judging section, and a selector or a multiplexer for receiving the output data from the data discriminating section and a discrimination output from the D-FF and selectively outputting either the output data or the discrimination output from the D-FF based on the phase control signal from the clock phase controller.

34. A parallel data receiver comprising;

a plurality of data discriminating circuits provided in association with a plurality of input signals transmitted in parallel;

a common clock signal generator;

a bit synchronizer for receiving discriminated data from the plurality of data discriminating circuits and providing bit synchronization between the discriminated data, with a clock signal from the common clock signal generator taken as a reference, each of the plurality of data discriminating circuits including, a data discriminating section for discriminating input data in synchronism with a clock signal and outputting resultant data as discriminated data, a phase-relation judging section for receiving the input data and the discriminated data and judging a phase relation therebetween, a clock phase controller for producing a phase control signal to control an initially-determined phase of the clock signal, based on an output of the phase-relation judging section, and a clock phase judging section for determining a phase of the clock signal and altering the initially-determined phase of the clock signal in accordance with the phase control signal from the clock phase controller; and a last bit detector, provided between the data discriminating section and the phase-relation judging section, for detecting a last bit of "1" when the input data contains consecutive 1s and inputting the last bit of "1" to the phase-relation judging section.

35. The parallel data receiver according to claim 34, further comprising a sync protection circuit on an output side of the phase-relation judging section.

36. The parallel data receiver according to claim 35, wherein the sync protection circuit includes:

a predetermined number of stages of cascade-connected D-FFs; a first AND gate for obtaining a logical product of Q outputs of the D-FFs;

a second AND gate for obtaining a logical product of Q1 outputs of the D-FFs which are logical inverted outputs with respect to the Q outputs;

an RS-FF having a set (S) input terminal and a reset (R) input terminal respectively supplied with outputs of the first and second AND gates, whereby an output of the last bit detector is input to a first stage of D-FF and a clock signal is commonly input to the other stages of D-FFs, allowing the first AND gate to perform forward protection and allowing the second AND gate to perform backward protection.

37. A parallel data receiver comprising:

a plurality of data discriminating circuits provided in association with a plurality of input signals transmitted in parallel;

a common clock signal generator; and a bit synchronizer for receiving discriminated data from the plurality of data discriminating circuits and providing bit synchronization between the discriminated data, with a clock signal from the common clock signal generator taken as a reference, each of the plurality of data discriminating circuits including, a data discriminating section for discriminating input data in synchronism with a clock signal and outputting resultant data as discriminated data, a phase-relation judging section for receiving the input data and the discriminated data and judging a phase relation therebetween, a clock phase controller for producing a phase control signal to control an initially-determined phase of the clock signal, based on an output of the phase-relation judging section, and a clock phase judging section for determining a phase of the clock signal and altering the initially-determined phase of the clock signal in accordance with the phase control signal from the clock phase controller, wherein the clock phase judging section receives two clock signals having a predetermined phase difference therebetween, and selectively outputs one of the two clock signals based on the phase control signal from the clock phase controller.

38. The parallel data receiver according to claim 37, wherein the clock phase judging section comprises a multiplexer or a selector.

39. The parallel data receiver according to claim 37, wherein the two clock signals having the predetermined phase difference therebetween have a mutually inverted phase relation.

40. The parallel data receiver according to claim 39, wherein the two clock signals having a mutually inverted phase relation are two signals obtained as outputs of an OR/NOR gate when one clock signal is supplied thereto.

41. A data discriminating circuit comprising:

a data discriminating section for discriminating input data in synchronism with a clock signal and outputting resultant data as discriminated data, the data discriminating section having a first D-FF supplied with the input data and the clock signal;

a phase-relation judging section for receiving the input data and the discriminated data and judging a phase relation therebetween, the phase-relation judging section having an inverter for inverting the input data, a second D-FF supplied with an output of the first D-FF and the inverted input data for discriminating the output of the first D-FF at a rising edge of the inverted input data, corresponding to a falling edge of the input data before inversion, a third D-FF cascade-connected to the second D-FF, which is set or reset by a discrimination output of the second D-FF and an AND gate for obtaining a logical product of the inverted input data and an output of the third D-FF;

a clock phase controller for producing a phase control signal to control an initially-determined phase of the clock signal, based on an output of the phase-relation judging section; and a clock phase judging section for determining a phase of the clock signal and altering the initially-determined phase of the clock signal in accordance with the phase control signal from the clock phase controller.

42. A parallel data receiver comprising:

a plurality of data discriminating circuits provided in association with a plurality of input signals transmitted in parallel;

a common clock signal generator; and a bit synchronizer for receiving discriminated data from the plurality of data discriminating circuits and providing bit synchronization between the discriminated data, with a clock signal from the common clock signal generator taken as a reference, each of the plurality of data discriminating circuits including, a data discriminating section for discriminating input data in synchronism with a clock signal and outputting resultant data as discriminated data, the data discriminating section having a first D-FF (flip-flop) supplied with the input data and the clock signal, a phase-relation judging section for receiving the input data and the discriminated data and judging a phase relation therebetween, the phase-relation judging section having an inverter for inverting the input data, a second D-FF supplied with an output of the first D-FF and the inverted input data for discriminating the output of the first D-FF at a rising edge of the inverted input data, corresponding to a falling edge of the input data before inversion, a third D-FF cascade-connected to the second D-FF, which is set or reset by a discrimination output of the second D-FF, and an AND gate for obtaining a logical product of the inverted input data and an output of the third D-FF, a clock phase controller for producing a phase control signal to control an initially-determined phase of the clock signal, based on an output of the phase-relation judging section, and a clock phase judging section for determining a phase of the clock signal and altering the initially-determined phase of the clock signal in accordance with the phase control signal from the clock phase controller.

43. The parallel data receiver according to claim 42, wherein the clock phase controller comprises a T-FF supplied with an output of the AND gate, and the clock phase judging section comprises an EXOR gate supplied with an output of the T-FF and a clock signal.

44. The parallel data receiver according to claim 42, further comprising a last bit detector, provided between the data discriminating section and the second D-FF, for detecting a last bit of "1" when the input data contains consecutive 1s and inputting the last bit of "1" to the second D-FF, the last bit detector including third through fifth D-FFS, which are cascade-connected, an EXOR gate having two inputs, one of which is for each of the plurality of data discriminating circuits, and the clock signal from the common clock signal generator is input to the first D-FF of each of the plurality of data discriminating circuits.

45. The parallel data receiver according to claim 44, wherein each of the synchronizer circuits has an inverter, a D-FF for discriminating an output data from the data discriminating section with a clock signal input via the inverter from the clock phase judging section, and a selector or a multiplexer for receiving the output data from the data discriminating section and a discrimination output from the D-FF and selectively outputting either the output data or the discrimination output from the D-FF based on the phase control signal from the clock phase controller.

46. A data discriminating circuit comprising:
- a data discriminating section discriminating input data in synchronism with a clock signal and outputting resultant data as discriminated data;
- a phase-relation judging section receiving the input data, which is non-discriminated data, and the discriminated data and judging a phase relation therebetween;
- a clock phase controller producing a phase control signal to control an initially-determined phase of the clock signal, based on an output of the phase-relation judging section; and
- a clock phase judging section determining a phase of the clock signal and altering the initially-determined phase of the clock signal in accordance with the phase control signal from the clock phase controller.

* * * * *

UNITED STATES PATENT AND TRADEMARK OFFICE
CERTIFICATE OF CORRECTION

PATENT NO. : 5,740,210
DATED : April 14, 1998
INVENTOR(S) : Rokugawa

It is certified that error appears in the above-identified patent and that said Letters Patent is hereby corrected as shown below:

Cols. 6, 7, 12 and 13, change "|8" to --18--.

Col. 11, line 11, "B2" should be --S2--;

line 20, after "signal" insert --generator 9--.

Col. 16, line 66, change "24" to --21--.

Col. 18, line 9, change "is" to --1s--.

Col. 21, line 14, change "is" to --1s--.

Signed and Sealed this

Fourth Day of August, 1998

Attest:

Attesting Officer

BRUCE LEHMAN

Commissioner of Patents and Trademarks